(12) United States Patent
Kambe et al.

(10) Patent No.: US 10,108,183 B2
(45) Date of Patent: Oct. 23, 2018

(54) PROCESS CONTROL SYSTEM AND CONFIGURATION SYSTEM

(71) Applicant: YOKOGAWA ELECTRIC CORPORATION, Musashino-shi, Tokyo (JP)

(72) Inventors: Takahiro Kambe, Singapore (SG); Alexander Yap, Singapore (SG); Wilfred Woon Yew Teo, Singapore (SG); Hideki Murata, Singapore (SG); Prakash Mariappan, Singapore (SG); JiSong Zhang, Singapore (SG); Lin Naing Oo, Singapore (SG)

(73) Assignee: YOKOGAWA ELECTRIC CORPORATION, Musashino-shi, Tokyo (JP)

( * ) Notice: Subject to any disclaimer, the term of this patent is extended or adjusted under 35 U.S.C. 154(b) by 931 days.

(21) Appl. No.: 14/539,074

(22) Filed: Nov. 12, 2014

(65) Prior Publication Data
US 2016/0132047 A1 May 12, 2016

(51) Int. Cl.
*G05B 19/418* (2006.01)
*G05B 19/042* (2006.01)

(52) U.S. Cl.
CPC ... *G05B 19/41845* (2013.01); *G05B 19/0426* (2013.01); *G05B 2219/23261* (2013.01); *G05B 2219/25067* (2013.01); *G05B 2219/31104* (2013.01); *G05B 2219/32137* (2013.01); *G05B 2219/33125* (2013.01); *Y02P 90/14* (2015.11); *Y02P 90/16* (2015.11); *Y02P 90/185* (2015.11); *Y02P 90/205* (2015.11); *Y02P 90/265* (2015.11)

(58) Field of Classification Search
None
See application file for complete search history.

(56) References Cited

U.S. PATENT DOCUMENTS

| | | | |
|---|---|---|---|
| 7,555,706 B2 | 6/2009 | Chapman et al. | |
| 2003/0058277 A1 | 3/2003 | Bowman-Amuah | |
| 2004/0073404 A1 | 4/2004 | Brooks et al. | |
| 2005/0222698 A1 | 10/2005 | Eryurek et al. | |
| 2008/0125877 A1 | 5/2008 | Miller et al. | |
| 2008/0162671 A1 | 7/2008 | Mann | |
| 2008/0258906 A1* | 10/2008 | Okita | G05B 19/042 340/532 |
| 2009/0118846 A1 | 5/2009 | Eldridge et al. | |
| 2009/0292514 A1* | 11/2009 | McKim | G09B 9/00 703/6 |
| 2011/0040390 A1 | 2/2011 | Blevins et al. | |
| 2011/0071651 A1 | 3/2011 | Law et al. | |

(Continued)

OTHER PUBLICATIONS

An Office Action dated Feb. 23, 2017, which issued during the prosecution of U.S. Appl. No. 14/538,264.

*Primary Examiner* — Tuan C Dao
(74) *Attorney, Agent, or Firm* — Sughrue Mion, PLLC

(57) ABSTRACT

A configuration system for a process control system configured to perform process control. The configuration system includes, not limited to, a) a definition module, which is stored in a memory, for a part of an industrial plant based on design data. The definition module includes, not limited to, a-1) a control logic definition file configured to define a control logic for the part, and a-2) a data definition file configured to define data relating to the defined control logic.

15 Claims, 19 Drawing Sheets

(56) References Cited

U.S. PATENT DOCUMENTS

| | | | |
|---|---|---|---|
| 2011/0191500 A1* | 8/2011 | Odayappan | G05B 19/0426 710/8 |
| 2014/0100668 A1 | 4/2014 | Jundt et al. | |
| 2014/0100676 A1 | 4/2014 | Scott et al. | |
| 2015/0233790 A1* | 8/2015 | Ratilla | G05B 19/0426 702/188 |
| 2016/0098388 A1* | 4/2016 | Blevins | G06F 17/30569 707/755 |

* cited by examiner

FIG. 2B

| Control logic_Part | Controller |
|---|---|
| 206_220 | FCS0101 |
| 206_222 | FCS0101 |
| 206_224 | FCS0101 |
| 206_226 | FCS0101 |
| 206_228 | FCS0101 |

FIG. 2C

| Control logic_Part | Controller |
|---|---|
| 206_220 | FCS0101 |
| 206_222 | FCS0101 |
| 206_224 | FCS0101 |
| 206_226 | FCS0102 |
| 206_228 | FCS0102 |

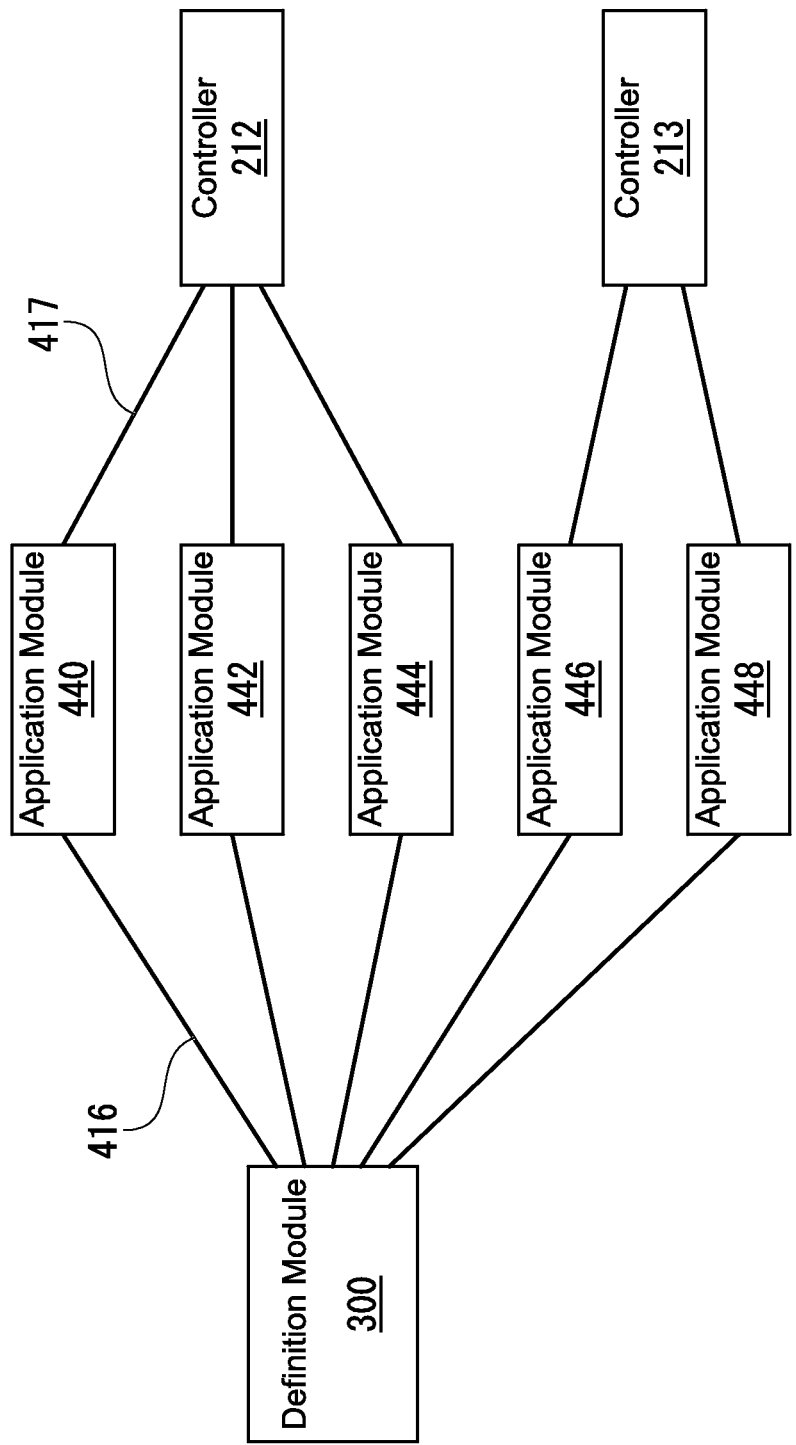

FDS-aaaa*
RevisionHistory
| No. | Author | Checker | Approver | Date | Description |

472 ⋯ Table Of Content

474
- ☑ 1 PIDCASCADE_A
  - ☑ 1.1 Control Drawing
    - ☑ 1.1.1 Parameter Setting
    - ☑ Parameter Setting
  - ☑ 1.2 Alarm Definition
    - ☑ Alarm parameters
  - ☑ 1.3 Narrative
    - ☑ XXXX Function description
  - ☑ 1.4 Applicable List
    - ☑ Applicable List
- ☑ 2 PIDCASCADE_B
  - ☑ 2.1 Control Drawing
    - ☑ 2.1.1 Parameter Setting
    - ☑ Parameter Setting
  - ☑ 2.2 Alarm Definition
    - ☑ Alarm parameters
  - ☑ 1.3 Narrative
    - ☑ XXXX Function description
  - ☑ 1.4 Applicable List
    - ☑ Applicable List

PROCESS CONTROL SYSTEM AND CONFIGURATION SYSTEM

FIELD OF INVENTION

This disclosure of invention relates to the field of industrial automation for an industrial plant. In particular, it relates to configuration of process control systems for the industrial plant.

BACKGROUND

FIG. 1A illustrates a process control system 100 of an industrial plant for oil, steel and chemical process industries. In the industrial plant, field devices such as sensors 102 and valve devices, actuators 104 measure or control processes such as fluid process performed by plant equipment. Examples of sensors 102 are flowmeters, temperature indicators, valve devices 104 are flow amount control valves and open/close valves, actuators 104 are fans and motors. The field devices 102, 104 are connected to a field network 106. The field devices 102, 104 are connected through input-output (I/O) units to controllers 108 which are in a control network 110. Based on measurements from the sensors 102, the controllers 108 perform computations which are used to generate signals to control the actuators. Each control logic in the controller 108 is encapsulated in a function block. The function block is defined to receive or generate input, output parameters defined for each field device and include algorithms to calculate the parameters. Parameters include process variables and tuning parameters which are generated in the function block. Process variable is variable for which a measurement exists, such as temperature, pressure, force, feed, flow rate, chemical composition, weight, position and speed. Tuning parameter is a variable applied in the controller to control the processes. Control logic is an algorithm of the controllers 108.

Human machine interface (HMI) terminals 112 in the control network 110, exchange data with the function blocks and provide information to operators for operating the process control system 100. The process control system 100 manages and issues commands, from the function blocks, for parts such as equipment and field devices based on the exchanged data. The issued commands are based on control logic which is prepared and modified in an engineering tool 120 according to design data, which is a specification of the industrial plant. The control logic is converted to binary control data for execution in the controllers and HMI terminals. The operators control and operate the industrial plant by applying the binary control data in the controllers and HMI terminals. The HMI terminals 112 screen definitions are prepared by the engineering tool 120. The function blocks, based on the measurements from the sensors and binary control data, perform computation to generate signals for the actuators. The operators set a design value for the tuning parameters during process tuning.

FIG. 1B illustrates the engineering tool 120 for setting or configuring the process control system 100. Users use an editor 122 in the engineering tool 120 to prepare and modify the control logic for any change in the design data of the industrial plant. Example of a change is to set a different field device parameter value for a different process or a different raw material for the process. The different process is for a different product or a different grade of a same product. The prepared and modified control logic is stored as serialized control data 124. The serialized control data 124 is read by a converter 126. The converter 126 generates, from the serialized control data 124, binary control data 128 which is control data in binary format. The binary control data 128 is stored in a database 130. The binary control data 128 is sent to process control system 100 for execution in the HMI terminals 112 and controllers 108.

In the industrial plant, there are many data files and data sets for the parameters. The parameters have complex data relationships when related data sets are of different type or source. An example is a parameter in a function block related to a controller. The parameter is defined as a first type in the function block and defined as a second type when in an alarm management system. The first type and second type of definitions are different. It is tedious to identify corresponding parameters to be updated in the control logic for the process control system 100 when a parameter or parameter relationship is changed in the design data.

Documents, such as instruction manuals, control logic definitions, and specifications, for the industrial plant are prepared manually as shown in FIG. 1C, using a tool which is separate and different from the engineering tool. The documents for the process plant, from the control logic to the control data, are prepared independently.

Since the documents are prepared manually, it is tedious and time-consuming to ensure that the documents are consistent with the control logic or control data for the industrial plant. In an example of an oil process plant, composition of raw materials such as oil depends on country of origin. Therefore, control logic in process control system of the process plant has to be changed for each different composition. Documents for the different control logic for the different composition of raw materials are manually prepared individually. The preparation is tedious and time consuming.

The documents are prepared by a user, who is either a customer or a vendor, of the engineering tool or process control system. As different users prepare and modify the control logic differently, the documents must be prepared or updated by the same user. This is inconvenient and cumbersome to other users.

Further, the control logic is changed continuously due to continuous operational improvements in the industrial plant. In an ideal situation, the documents are updated for every change in the control logic. However, in reality, it is logistically challenging to update the documents every time there is a change in the control logic. Therefore, the documents are usually not updated. In some cases, users consolidate changes in the control logic to update the documents periodically. Mistakes and oversights are common occurrences during the preparation or update of the documents, since documentation is a manual process. The periodic update can cause more inaccuracies. This results in inconsistency between the control logic and the documents. When the documents lack accuracy, the documents are not reliable documentation for the process plant.

In a typical industrial plant, a specification document consists of thousands of pages. It is tedious and time-consuming to update such a huge document manually. In order to ensure that the documents are consistent with the control logic, a lot of additional man-effort, time and cost are required for the manual process. This increases the cost to maintain and update the process control systems. In addition to the cost of maintenance and update of the control logic, an additional cost is required to ensure that the documentation is consistent with the control logic, when a change is required for the process control system. In a cost competitive environment for process industries, the cost to maintain documentation is put off or avoided completely. In these situations, the documents are obsolete from a lack of update. There is a need to improve the preparation and update of the documents.

Industrial plants are designed and built to last for a long period of 30 years or more. In a typical large scale industrial plant, the process control system controls more than 10,000 field devices. There are many complex and advanced functions in the process control system. For an industrial plant which has many complex and advance functions, many users are required to work together to maintain or update control logic of the plant control system. The users would have been changed over the years of plant operation. Existing users have to refresh their understanding on the control logic, and new users have to find out and understand the control logic, in order to make changes to the control logic. One way to understand the control logic is from the documents. It is not possible to understand from the documents when the documents are inconsistent with the control logic due to the reasons explained above.

There are many engineering tasks to prepare a process control system. One engineering task is a method of generating the control logic or the document. Tests are performed on the generated control logic to ensure that the control logic is correct. Engineering tasks, design, generation and testing of control logic, are performed repetitively since the control logic includes data specific to each controller 108. This requires a lot of effort and time to prepare the process control system 100 for the industrial plant.

Different users perform engineering tasks differently. More effort is required from the user who does the maintenance when the user is different from a previous user. There is a need to improve and standardize the quality of engineering tasks. This is to improve the ease of understanding the process control system of the process plant.

The users have to spend additional man-effort and time to decipher the control logic and verify using different types of document, such as specification documents with all revision changes. This incurs additional cost for the maintenance of the process control system.

There is a need to improve the efficiency to prepare, modify and maintain a process control system and its documentation by reduction of the man-effort, time and cost involved. Further, the consistency of the control logic and the documentation needs to be improved. There needs to be a mechanism to enable continuous maintenance and operational improvements efficiently.

SUMMARY

A configuration system for a process control system configured to perform process control. The configuration system includes, not limited to, a) a definition module, which is stored in a memory, for a part of an industrial plant based on design data. The definition module includes, not limited to, a-1) a control logic definition file configured to define a control logic for the part, and a-2) a data definition file configured to define data relating to the defined control logic.

BRIEF DESCRIPTION OF DRAWINGS

FIGS. 2B and 2C are examples of allocating control logic to controllers according to some embodiments of the invention.

FIG. 4B illustrates an example of generated links between a definition module and application modules; and defined links between application modules and controllers.

FIG. 7C is an example display screen for a document layout configurator according to some embodiments of the invention.

DETAILED DESCRIPTION

Process Control System

Figure 1A:
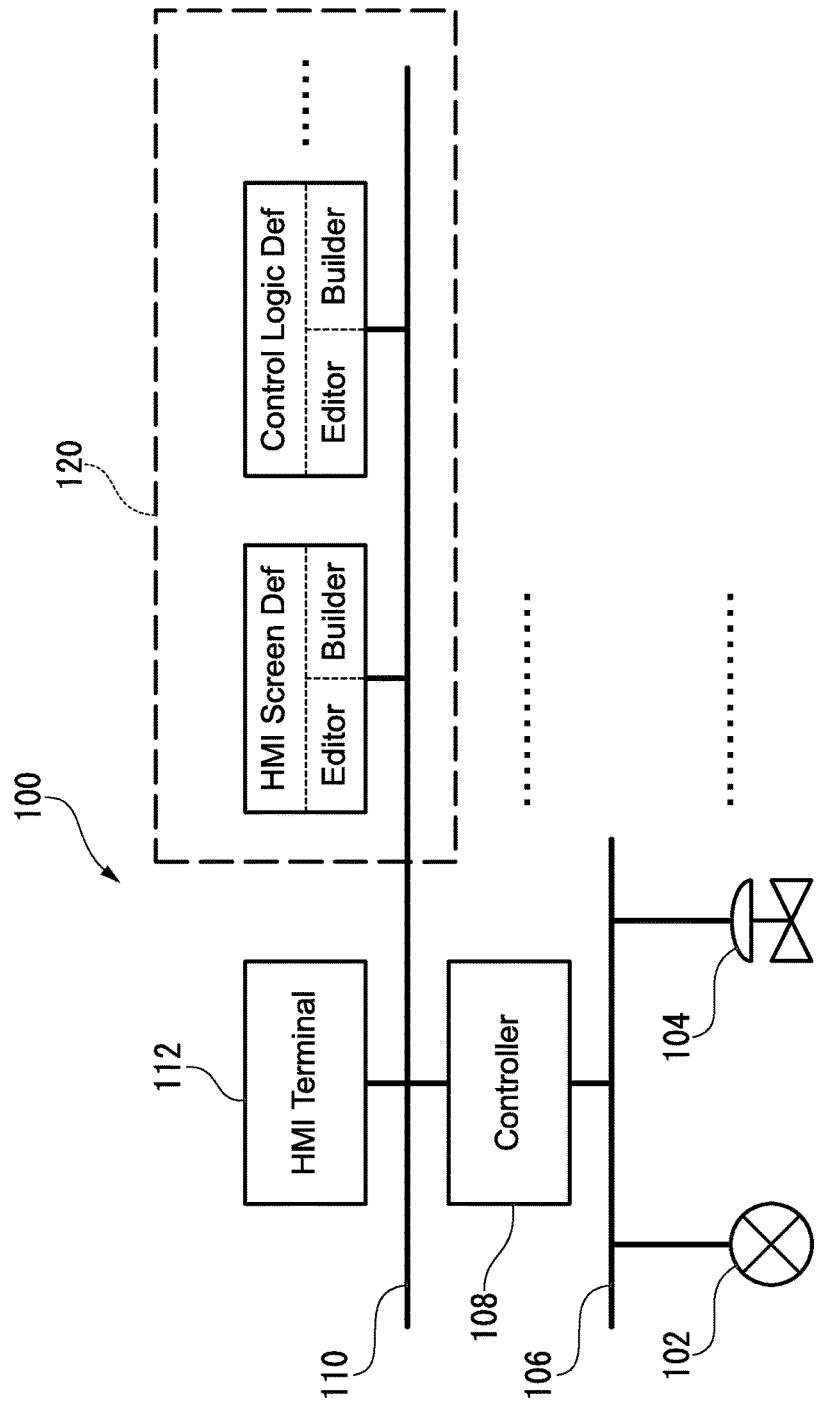
FIG. 1A is a process control configuration system in a related art.
Figure 1B:
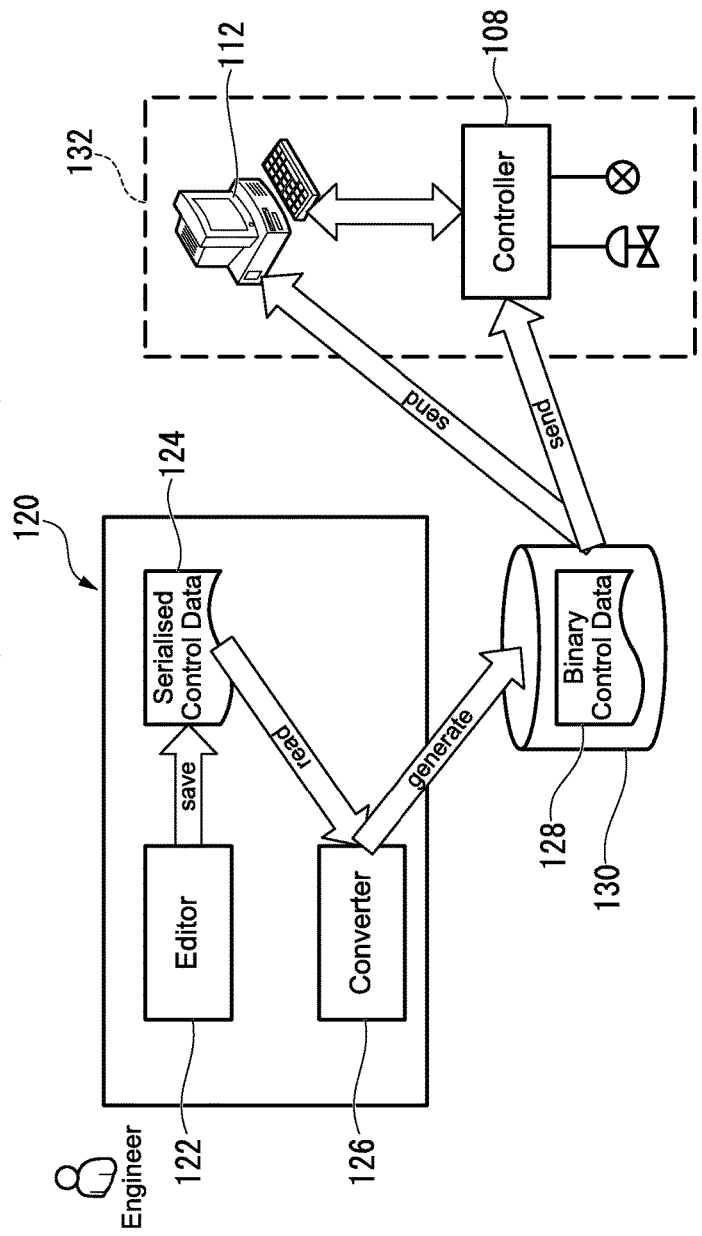
FIG. 1B is a diagram of an engineering tool in a related art.
Figure 1C:
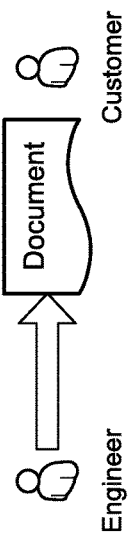
FIG. 1C shows a manual workflow to prepare plant documents in a related art.
Figure 2A:
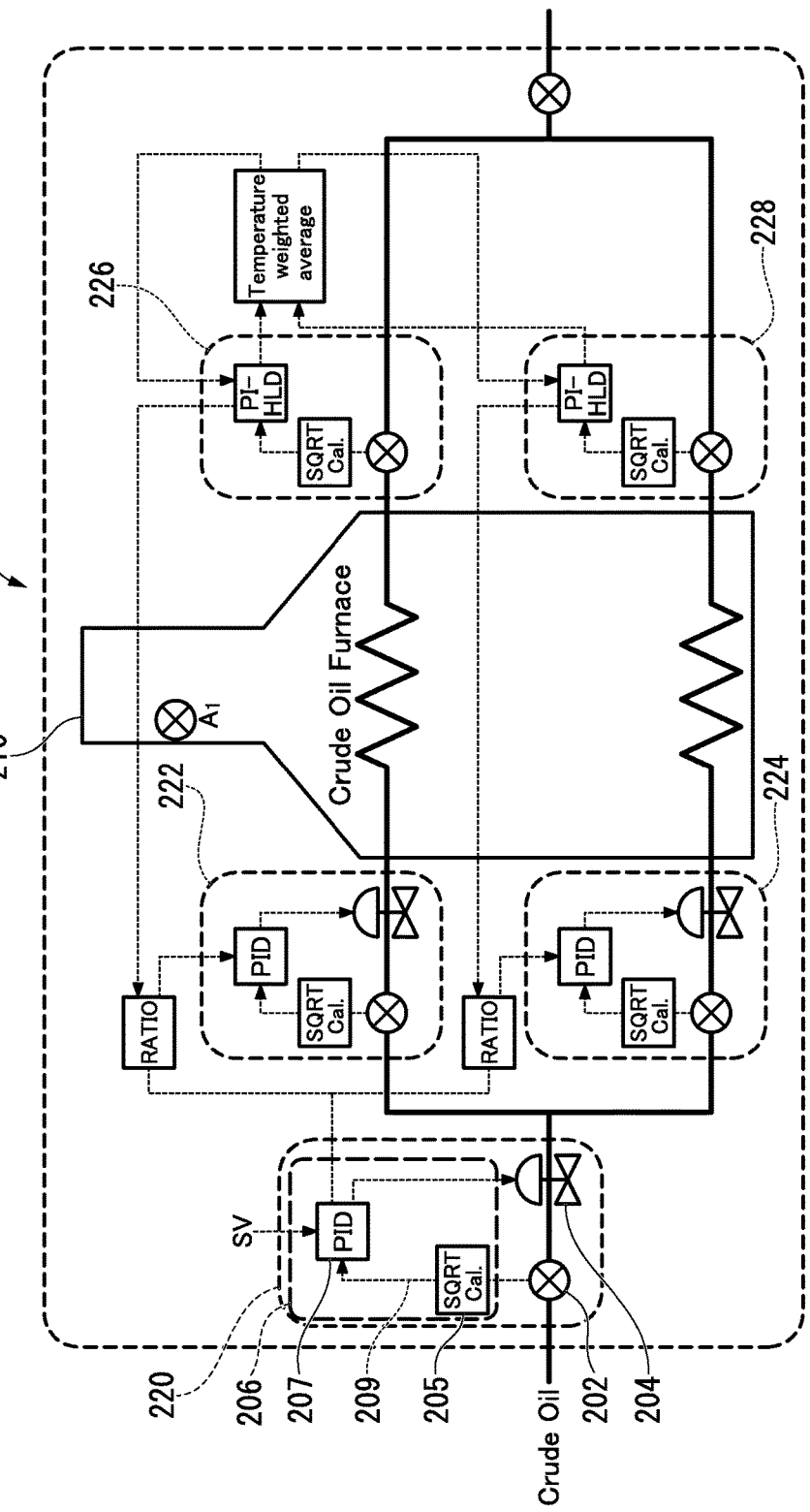
FIG. 2A is a piping and instrumentation diagram of an example process control.

FIG. 2A is a diagram of an example process control system 200 for equipment 210 in an industrial plant 230 (not shown). In the example, the equipment 210 is a crude oil furnace. The process control system 200 has parts 220, 222, 224, 226, 228 to control different parts of the equipment 210. The parts 220, 222, 224, 226, 228, each consists of sub-parts. In the example, the part 220 has sub-parts, field devices 202, 204 and control logic 206. The control logic 206 is performed in a controller 212 (illustrated in FIG. 9) for controlling a process 232 (not shown) in the industrial plant 230. In this example the control logic 206 is for controlling the field devices 202, 204 according to design data 234 (not shown) for the industrial plant 230.

In this example, field device 202 is a sensor, an input device which sends an input parameter to the controller 212. The controller 212 has control logic 206 in two function blocks, a first function block 205 and a second function block 207. The function blocks 205, 207 are software components in the controller 212 for processing the control logic 206. The input parameter is processed in the first function block 205 prior to being processed in the second function block 207 to generate an output parameter. The controller 212 then transmits the output parameter from the second function block 207 to field device 204, an output device which is an actuator to a valve in this example. In this example, the field devices 202, 204 are connected to a hardware interface component, such as an input-output (I/O) card or module, which is then connected to the first function block 205 and second function block 207 in the controller.

A process control system 200 for the industrial plant 230 consists of a plurality of process control systems 200 for same or different types of equipment 210 according to some embodiments of the invention.

The process control system 200 includes a plurality of processers and a plurality of HMI terminals 218 (not shown). Each HMI terminal 218 consists of a HMI screen 217 (not shown) and an input device. The HMI screen 217 displays the part 220 and accordingly for the sub-parts, field devices 202, 204. The HMI screen 217 displays all the parts 220, 222, 224, 226, 228 and their sub-parts, the field devices 202, 204, the control logic 206 according to some embodiments of the invention.

The process 232 includes, not limited to, a process in the equipment 210 and a process in each part 220, 222, 224, 226, 228. Alternatively, the equipment 210 is a part which consists of parts 220, 222, 224, 226, 228. In this alternative, the process in the equipment 210 consists of processes in parts 220, 222, 224, 226, 228.

Parts

The term "part" in the context of the phrase "part of an industrial plant" means "not whole", one of pieces which constitute an industrial plant. The term "part" in the context of the phrase a process control target as a part of the industrial plant means a target which is subject to the process control performed by the process control system. The "part" or the "process control target" can be hardware alone, software alone or the both in combination. Some illustrative examples of the "part" or the "process control target" may include, but are not limited to, a field device, function blocks, connector, controller, HMI screen. The term "part-related data" means data related to the part or the "process control target" mentioned above. If in a case the "part" is a field device", then the part-related data means a set of data which is related to the field device.

For an industrial plant 230 considered as a whole, a division of the whole industrial plant 230 is referred to as a part. In the present invention, part is a component or an area of the industrial plant 230. Components include, not limited to, field devices 202, 204 such as sensors and actuators, control logic 206, controllers 212 and equipment 210. The controllers 212 include function blocks 205, 207, connector 209 between related function blocks 205, 207 according to some embodiments of the invention. The part consists of a plurality of sub-parts when the component is made up of other components. For example, a part 220 is an assembly from very basic blocks such as function blocks 205, 207 and connector 209 for the function blocks 205, 207.

Usually the industrial plant 230 is virtually divided into different areas for management. For example, area is a collection of components for a particular process, or a collection of components in a physical location. The area is further divided into a cell, a unit for ease of identification, reference or configuration.

For a graphical user interface considered as a whole, a component which is used to configure for the graphical user interface to be shown on a HMI screen is referred to as a part. For example part is a data access part such as numeric data part, bar graph part, text part, image part. In another example, part is a non data access part such as label part and link part.

Part includes at least one input parameter and one output parameter according to some embodiments of the invention. One of the input parameter or output parameter is fixed and cannot be manipulated according to some embodiments of the invention.

A process control system element means a part, but not whole, of a process control system.

Design Data

Design data 234, which is design specifications for the industrial plant 230, include data for configuration of a process control system 200 for process 232. Design data 234 include data for components such as field devices 202, 204, control logic 206, equipment 210, controller 212, function blocks 205, 207, connector 209 and data specific to each component.

Definition Module

A process control system 200 and its configuration system include a plurality of hardware and software components. A definition module 300 is an additional software component which resides on a memory. The definition module 300 is suitable to be used in the process control system 200. The definition module 300 is suitable to be used in the configuration system for the process control system 200 according to some embodiments of the invention. Alternatively, an application module 440, which is an instance of the definition module 300, is a software component on a memory. The application module 400 is a software component of at least one of the process control system 200 and the configuration system of the process control system 200.

Figure 3B:
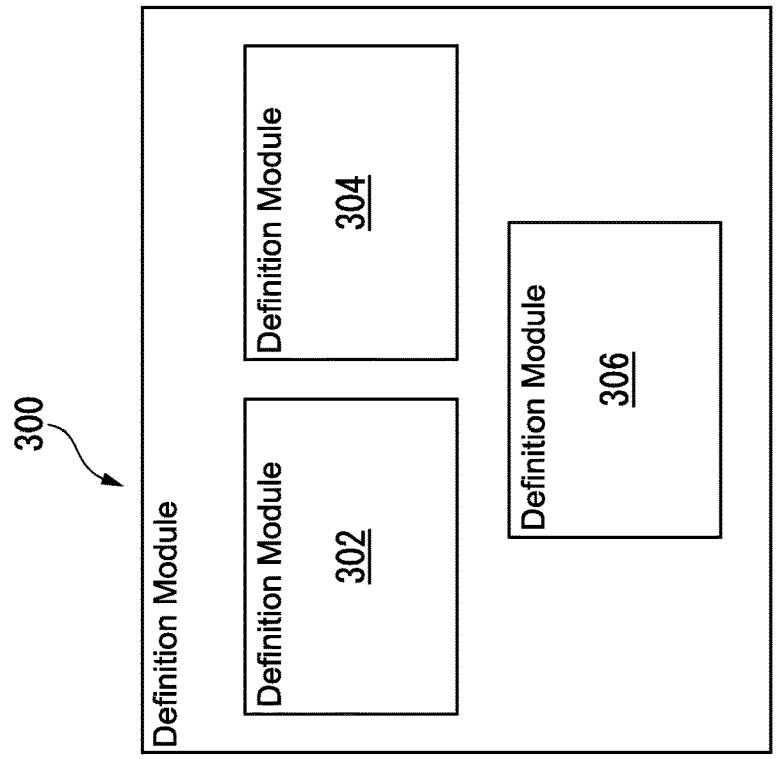
FIGS. 3A, 3B, 3C illustrate a definition module according to some embodiments of the invention.
Figure 3A:
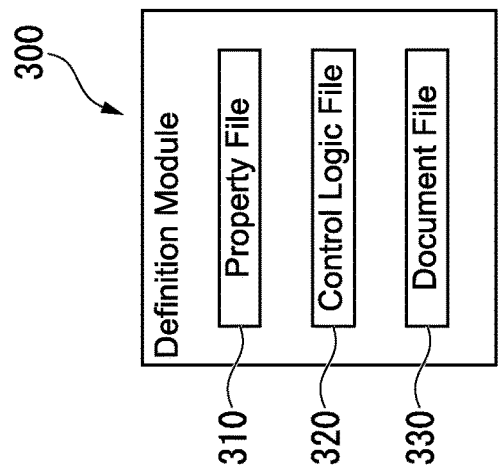

FIG. 3A illustrates a definition module 300 according to some embodiments of the invention. The definition module 300 is defined to represent the part 220 of the process control system 200 in the industrial plant 230.

Alternatively, FIG. 3B further illustrates definition modules 302, 304, 306 for sub-parts, the field devices 202, 204 and the control logic 206 respectively. In this alternative, the definition module 300 consists of the definition modules 302, 304, 306 according to some embodiments of the invention. The definition module 306 is defined for control logic 206. The control logic 206 consists of function blocks 205, 207, and connection 209 between function blocks 205, 207. Function blocks 205, 207 are further defined in separate definition modules according to some embodiments of the invention.

Figure 3C:
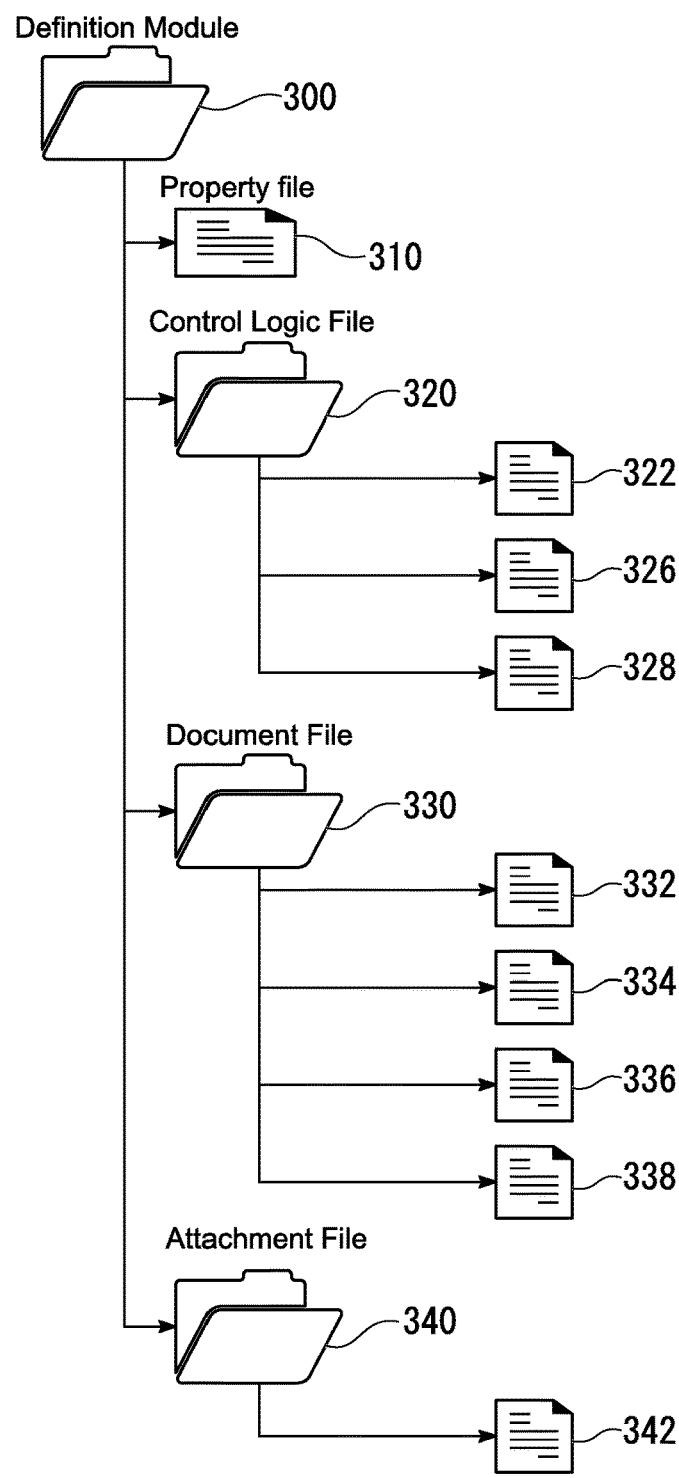

FIG. 3C illustrates the definition module 300 according to some embodiments of the invention. The definition module 300 includes one of a property file 310, a control logic file definition 320 and a data definition file 330. The definition module 300 further includes a plurality of the control logic definition files 320, a plurality of data definition files 330 according to some embodiments of the invention. The plurality of each type of file, control logic definition file 320 and data definition file 330, are stored in separate definition files according to some embodiments of the invention.

The definition module 300 is configured based on the design data 234 related to part 220. The definition module 300 is reusable for similar parts 222, 224, 226, 228 in the same or different industrial plant 230. This reduces unnecessary repetitive tasks to define a similar definition module 300 for different parts 222, 224, 226, 228.

The definition module 300 is configured based on type of part according to some embodiments of the invention. In an example, the definition module 300 is configured for a generic part based on generic design data 234. The generic design data 234, which has no restriction, is independent of the process control system 200. The definition module 300 is then defined for the part 220 by being updated with the design data 234 for the part 220. An example is instantiating the definition module 300 with design data 234 for the part 220.

Advantageously, the definition module 300 is generated with the generic design data 234 and is updated with actual design data 234 at a later time. This improves convenience of configuration for the process control system 200.

Property File

The property file 310 includes module properties of the definition module 300. The property file 310 is used to search and identify users and usage of the definition module 300. Examples of the properties are an identifier which is unique for the definition module 300, access permission which is required for modification of the definition module 300, at least one keyword to facilitate an external search of the definition module 300 and a last modified date to act as a reference to indicate a recent update or to schedule a next maintenance.

Additional properties which are added to the property file 310 of the definition module 300 include information which is related to the part 220. Examples of information which are added to the property file 310 are HMI screen 217 settings for operation and monitoring HMI terminals 218 of the part 220; control logic information such as source code, version, size, timestamp; firmware version, settings, revision history, physical location of the part 220; network information such as media, speed, hardware and software interface settings, external connection terminals, firewall information of the part 220; logical and physical connection information of the part 220; simulation model which the part 220 uses; plant information such as version number of piping and instrumentation diagram, process flow diagram for the part 220.

There is a plurality of property files 310 for the definition module 300 according to some embodiments of the invention. Each of the plurality of property files 310 is for a different property to improve the ease of preparation of the definition module 300 when the part 220 is modified.

In an example, a HMI screen 217 is displayed on one or more HMI terminals 218 for the part 220 and accordingly for the sub-part field device 202. There are multiple HMI screens 217 displayed on HMI terminals 218 when the HMI screen 217 varies with process conditions or user preferences for the part 220. Each HMI screen 217 setting for each variation of HMI screen 217 is in a separate property file 310. This improves the ease of determining whether the HMI screen 217 is related to process conditions or user preference for the part 220.

Control Logic Definition File

The control logic definition file 320 includes one of a control logic definition 322, an alarm definition 326 for the part 220. Control logic definition 322 consists of control logic 206, which is a process algorithm for input-output (I/O) signals. Input signal from the field device 202 is defined to be applied to the control logic definition 322 for the control logic 206, which is defined to generate an output signal to the field device 204. Examples of I/O signals are process variables, such as values received from the sensor 202 and values transmitted to control valve 204. Process variable is variable for which a measurement exists, such as temperature, pressure, force, feed, flow rate, chemical composition, weight, position and speed.

An additional control logic definition 322, is included in the control logic definition file 320, when the control logic 206 is available or imported from an external source. This is convenient to include control logic definition 322 in any format which is imported to the definition module 300.

The control logic definition file 320 includes an alarm definition 326 file for the part 220 according to some embodiments. Similarly, alarm definition 326 consists of alarm control logic or algorithms for input-output (I/O) signals from the sub-parts, field devices 202, 204. For example, an alarm is activated based on the input signal from the field device 202 or output signal to the field device 204, such as the I/O signals being out of a predefined range.

The definition module 300 is further improved to provide alarm management functions without using another alarm notification tool. Resources to configure and maintain the process control system 200 with alarm management function further improves consistency with design data 234 compared with using a separate independent alarm management tool.

In addition to the control logic definition 322, parameter setting 324 (not shown) values for sub-parts, the field devices 202, 204 are defined in the control logic definition file 320, and alarm setting 325 values (not shown) in the alarm definition file. The parameter setting 324 values include, not limited to, tag name, tag comment, range.

Tuning Parameters

The process algorithm in the control logic definition 322 further includes tuning parameters. Tuning parameter is a variable generated and applied in the control logic 206 to control the process 232. Using an example of a proportional-integral-derivative (PID) controller which has the following generic algorithm for control logic:

$$u(t) = K_p e(t) + K_i \int_0^t e(\tau)d\tau + K_d \frac{d}{dt}e(t)$$

where
  $K_p$: Proportional gain, a tuning parameter
  $K_i$: Integral gain, a tuning parameter
  $K_d$: Derivative gain, a tuning parameter
  e: Error=Set Point−Process Variable
  t: Time or instantaneous time (the present)
  T: Variable of integration; takes on values from time 0 to the present t In the above control logic for the PID controller, $K_p$, $K_i$, $K_d$ are examples of tuning parameters. A person skilled in the field of process control systems understands that there are other tuning parameters generated in a function block which is processing the control logic.

Tuning parameter includes alarm setpoint. The alarm setpoint is a tuning parameter defined in the alarm definition 326 for alarm management in the process control system 200.

An example use of the tuning parameters is for tuning the process 232 when the definition module 300 is used for a first time. The tuning parameter, a function block data item, is generated in function blocks 205, 207 of the control logic 206. Thus, the tuning parameter is only available when the process control system 200 is in operation. When tuning parameters are required for the first tuning, default values or user input values are used.

During configuration of the definition module 300, a fixed value is defined in the control logic 206 for the part 220 to realize a required specific function. The fixed value is a design value, an initial value or a user-defined value according to some embodiments of the invention. An example use of the fixed value is during a runtime, which is execution, of the process control system 200. The fixed value is assigned during the tuning phase of the control logic 206.

During an operation of the process control system 200, a current value which is generated in the function block is retrieved for comparison with the fixed value. The comparison is used to monitor or control the process 232. This improves efficiency of user during operations and setting the process control system 200 when the tuning parameter, a fixed value, is provided with the definition module 300. There is no need to rely on experience of the user, or look up a reference source for the fixed value. In addition, the current value generated in the function block is stored as an updated fixed value when the current value is determined to be a preferred value for tuning the control logic 206.

A converter tool such as a generation manager 500 converts the control logic definition 322 in the definition module 300 to control program or control data 510. Control data 510 is transmitted or loaded to controllers 212 in the process control system 200 and is different for different processes 232 or industrial plants 230. The controller 212, executes the control data 510, which reads the definitions to control the industrial plant 230.

In an example, a control logic definition file 320 is configured for the part 220. Control logic 206 for the controller 212 is encapsulated in function blocks 205, 207. The controller 212 reads the control logic 206 in the control data 510, identifies an input process variable, performs the algorithms in function blocks 205, 207 to generate an output process variable, and identifies a destination for the output process variable. Examples of the destination are another controller, a field device. In some examples, the control logic 206 receives input parameters, such as process variables from the field device 202 or user input from HMI terminal 218, to be applied to the process algorithm for processing and generate an output parameter to control the field device 204. In some examples, the control logic 206 has the predefined input parameters. Behavior of the field device 204 is dependent on the input parameters and the process algorithm.

The definition module 300 which has control logic 206 configured for the parts 220, 222, 224, 226, 228 being independent on the physical binding or assignment of the control logic 206 for the parts 220, 222, 224, 226, 228 to the controller 212. Using examples in FIGS. 2B and 2C for explanation, control logic 206, of parts 220, 222, 224, 226, 228, are defined in a controller 212 identified as "FCS0101" in the definition module 300. In a first assignment in FIG. 2B, the control logic 206 for parts 220, 222, 224, 226, 228 are assigned to a controller 212 "FCS0101". In an alternative second assignment in FIG. 2C, control logic 206 for parts 220, 222, 224 are assigned to the first controller 212 "FCS0101" and parts 226, 228 control logic 206 to a second controller 213 (not shown) "FCS0102". The control logic 206 in parts 220, 222, 224, 226, 228 are valid for both types of assignment.

The control logic definition file 320 includes any one of: control logic definitions 322, alarm definitions 326, parameter settings 324 and alarm settings 325 for the part 220, the sub-parts the field devices 202, 204, the control logic 206, according to some embodiments of the invention. In an example embodiment of a part 220 which includes a network device 208 (not shown), such as router, hub or switch, the control logic definitions 322, alarm definitions 326, parameter settings 324 or alarm settings 325 for the network device 208 are included.

A typical industrial plant 230 consists of field devices 202, 204 which are provided by different vendors. The control logic definitions 322, alarm definitions 326 are prepared in a vendor-specific format for the part 220 and sub-parts, field devices 202, 204. Alternatively, the control logic definition 322 is prepared in a generic format based on an industrial standard.

The control logic definition file 320 refers to a location in the definition module 300 for storage of contents described above when the control logic definition file 320 is a folder according to some embodiments of the invention.

Data Definition File

The data definition file 330 stores design data 234 which relates to the control logic definition 322 for the part 220. The control logic definition 322 is updated when the design data 234 is updated. This ensures that the control data 510 executed for the process 232 is consistent with the design data 234.

Rule Definition File

The data definition file 330 includes a rule definition 328 file according to some embodiments of the invention. The rule definition 328 is applied to update or change parameter setting 324 values for the part 220 or other parts, the field devices 202, 204. The parameter setting 324 values in the control logic definition 322 are changed according to changes in referenced data related to the design data 234. Referenced data is user configured and editable data, such as from customers, vendors, specific to a particular equipment, process or product. The referenced data is configuration or settings data for field devices, or in control logic definitions 322, alarm definitions 326.

The rule definition 328 includes at least one condition and one action for setting a parameter in the referenced data to the control logic parameter, when the condition is fulfilled. An example of a rule: control logic parameter "param01" setting for field device is "5" when corresponding configuration "config_value" setting for field device in referenced data is "1".

The referenced data is in a data source according to some embodiments of the invention. The term "data source" means one or more sets of data, a repository or a database stored in a memory or a storage configured to store those data non-transitory. The data source is a combination of hardware such as a memory or a storage with one or more sets of data such as a repository or a database according to some embodiments of the invention. An example of the data source is an input-output (I/O) list in a file structure stored in a memory which is same or separate from the definition module 300. An example of I/O list includes all field devices 202, 204 and their properties and parameters. The I/O list is updated periodically when there is a change in the parameter. The rule definition 328 updates the parameter change in the definition module 300.

Access rights to edit the rule definition 328 file is restricted to experienced or authorized users, such as developers or designers of the definition module 300. Other users have access rights to view and use the rule definition 328. This is to minimize errors or inconsistencies between the control logic definition 322 defined for the part 220 and the design data 234 designed for the part 220. The rule definition 328 file is in the control logic definition file 320 according to some embodiments of the invention. This improves the ease of setting access rights to view and use, without rights to edit, the rule definition 328 file when the rule definition 328 file is in the control logic definition file 320.

The rule definition 328 interprets and provides complex relationships of parameters in the design data 234. Consistency of the definition module 300 with the design data 234 is improved when the rule definition 328 is included in the definition module 300.

The rule definition 328 file includes a plurality of rule definitions 328 according to some embodiments of the invention. The rule definitions 328 include an option property for the user to select or deselect the rule definition 328 for each control logic definition or parameter according to some embodiments of the invention. The rule definitions 328 further include a rank property to define a priority sequence for the rule definitions 328. This further improves the consistency with the design data 234.

The rule definition 328 being included in the definition module 300 is more convenient and efficient compared to a conventional system to include a link in an object with control logic to an external rule database. Further, the maintenance and visibility of the complex parameter relationships are improved compared to the conventional system in which both the link and the external rule database have to be maintained to ensure consistency with the design data 234.

Document Definition File 331

The data definition file 330 includes a document definition file 331 (not shown) which stores document data 332 according to some embodiments of the invention. The document data 332 includes design data 234 which is required to generate plant documents 530. The document data 332 is not used during implementation, such as parameter setting 324, alarm setting 325, for direct settings or configuration in part 220, sub-parts the field devices 202, 204, the control logic 206, the function blocks 205, 207, connector 209, the network device 208, The document data 332 includes test procedure or test data for the definition module 300 according to some embodiments of the invention. The document data 332 is used to generate plant documents 530 such as industrial plant 230 specifications, instruction manual, control logic definitions 322 specifications, alarm definitions 326 specifications and any such document related to the industrial plant 230. The document data 332 includes, not limited to, test function data, actual or representative images of HMI screen 217, actual or representative images of part 220, subparts the field devices 202, 204, the control logic 206, the network device 208, and any other information. Other information includes a text file or a video which is an explanation or illustration of the industrial plant 230 or control logic definition 322.

Plant documents 530 are generated from the document definition file 331 are updated to be consistent with the control logic definitions 322, in process control system 200 since the definitions are based on the same source, the design data 234.

There is a plurality of document definition files 331 for the definition module 300 according to some embodiments of the invention. Each of the plurality of document definition files 331 is for a different type of the document data 332. For example, each document definition file 331 is prepared separately for each control logic definition 322, alarm definition 326, rule definition 328 when there is a plurality of control logic definitions 322, alarm definitions 326, rule definitions 328 in the definition module 300. This improves the ease of preparation of the plant document 530 when the different types of the document data 332 are prepared in a plurality of document files 331. Further, this improves an ease of maintenance for the document files 331.

Each document definition file 331 consists of documents files, such as layout file 334, paragraph file 336, section file 338, according to some embodiments of the invention. The layout file 334 defines an arrangement and management of document data 332 which is used to generate a specific plant document 530. The paragraph file 336 is a management of the document data 332 by preparing one paragraph for each data portion or narration of the data portion. For example, one paragraph of document data 332 is stored in one text file. Accordingly, the layout file 334 defines the layout of a plurality of paragraph files 336 when there is more than one paragraph file 336. The layout file 334 and the paragraph file 336 are combined in one narrative document file according to some embodiments of the invention. However, an ease of management and use is improved when the layout file 334 and the paragraph files 336 are managed in separate document files.

Section file 338 is a definition of the document data 332, in text or images, for a section, a sub-section or a chapter which is a collection of sections, sub-sections.

Further, the document data 332 includes attachments according to some embodiments of the invention. Examples of attachments are documents or data which are used generate plant documents 530 or to be included with control data 510. The attachments are stored individually or collectively in an attachment file 340 as document data 332 consists of text and images. The attachment file 340 consists of a document file, attachment list file 342 to manage a plurality of attachments, which are used or attached in plant documents 530 in the definition module 300, when there is more than one such file to be attached. The plurality of such files to be attached is listed in the attachment list file 342.

Based on the types of document data 332 available, document definition files 331, attachment files 340 are structured or configured to improve the ease and efficiency of managing the document data 332 for generating the plant documents 530. Different users can update the document data 332 and generate any type of plant documents 530 when the design document 332 is arranged in the structured document definition files 331, attachment files 340.

The document definition file 331 refers to a location in the definition module 300 for storage of contents described above when the document definition file 331 is a folder according to some embodiments of the invention.

Repository

The definition module 300, the control logic definition files 320, alarm definition 326 files, data definition files 330, rule definition 328 files, document definition files 331 are stored in a repository 1300 after configuration for retrieval to be reused or updated for the same part 220 or different parts 222, 224, 226, 228. The repository 1300 is on the same computer as an editor tool for the definition module 300. The repository 1300 is located on a secured location, such as a separate server, computing cloud according to some embodiments of the invention. This allows the repository 1300 to be securely available to more users. Users access the repository 1300. This reduces unnecessary repetitive tasks to define similar control logic 212 for different parts 222, 224, 226, 228. The task to define is a control logic 212 is done only once in the definition module 300 for the equipment 210, instead of five times.

The repository 1300 includes a repository tool to manage contents in the repository 1300. The repository tool has assignment function to assign global properties to the contents such as a global identifier and a revision number, in particular the definition modules 300 and application modules 440. The definition modules 300 and application modules 440 include a license mark property for the assignment function to assign a license mark when the module has been licensed to users.

The repository tool includes internal data used to manage contents in the repository. The internal data includes user information such as access rights to browse, search, upload, download and generate reports, licensed contents, files, search function to index browse and search. The internal data includes usage information for the contents, such as usage statistics, usage history for example last user, last download.

Based on global properties such as revision number and internal data such as user licensed contents, the repository tool includes a notification function to send notifications to user when there is a change in a global property. In an example, the notification function sends updated contents to a licensed user when a new revision is available.

Based on the global properties and internal data, a user such as a customer of the repository 1300 can browse to identify useful contents for configuration or set up of the process control system 200.

Utilization of accumulated skills and experience to prepare the contents in the repository 1300 are maximized when the contents are uploaded to be accessible by multiple users. Resources are to prepare or modify a process control system 200 are minimized when users download the contents from the repository 1300.

Concept of Implementation

The present invention is implemented in an editor tool 400 using an object oriented programming concept. The definition module 300 is a parent class when it is a base module. A child definition module is a child class when the child definition module inherits the parent definition module 300. Changes in the parent class are automatically updated in child class. Thus, the child definition module does not require a corresponding manual update when the parent definition module 300 is changed, since the child definition module is updated automatically.

The definition module 300 is applied to parts 222, 224, 226, 228 since the parts are similar to part 220. From FIG. 2A, the same definition module 300 is applied to the parts 220, 222, 224, 226, 228 since the parts 220, 222, 224, 226, 228 have 2 inputs. Further, a definition module 301 (not shown) is prepared for the equipment 210. The definition module 301 consists of five definition modules 300 according to some embodiments of the invention. The definition module 301 has multiple nesting levels when the definition modules 300 further include definition modules 302, 304, 306 for sub-parts 202, 204, 206.

An application module 440 is an instance of the definition module 300 for part 220 according to some embodiments of the invention. The application module 440 is generated or instantiated when the definition module 300 is assigned specific parameters based on the design data 300 or a data source. Accordingly, application modules 442, 444, 446, 448 are instances for respective parts 222, 224, 226, 228. The application module 440 is an instantiated object according to some embodiments of the invention.

Using an example to explain, the definition module 300 has generic information such as generic control logic. In this example, the generic control logic can be used for any control logic by including specific values during an instantiation. The definition module with generic control logic is similar to a template. The application module 440 is an instantiated definition module 300, which means the control logic in the application module 400 has specific values. The application module 440 is no longer a template since it has specific values. The control logic in the application module 440 is for a specific part, not for a generic part. Parameters or data in the control logic of the application module 440 have been updated based on the data defined in the data definition file 330. In the application module 440, the data definition file 330 is the same as that in definition module 300.

Advantageously, this invention requires configuration of only one definition module 300, instead of five definition modules to be used for the equipment 210 according to some embodiments of the invention. Thus, the definition module 300 is re-used for other similar parts. This improves efficiency during preparation, maintenance and update of the definition modules 300 for the equipment 210 which includes parts 220, 222, 224, 226 228.

All application modules 440, 442, 444, 446, 448 are updated when a parameter change in the design data 234 is updated in the definition 300. Efficiency of configuration and setting a process control system 200 is improved with this invention.

Editor Tool 400

Figure 4A:
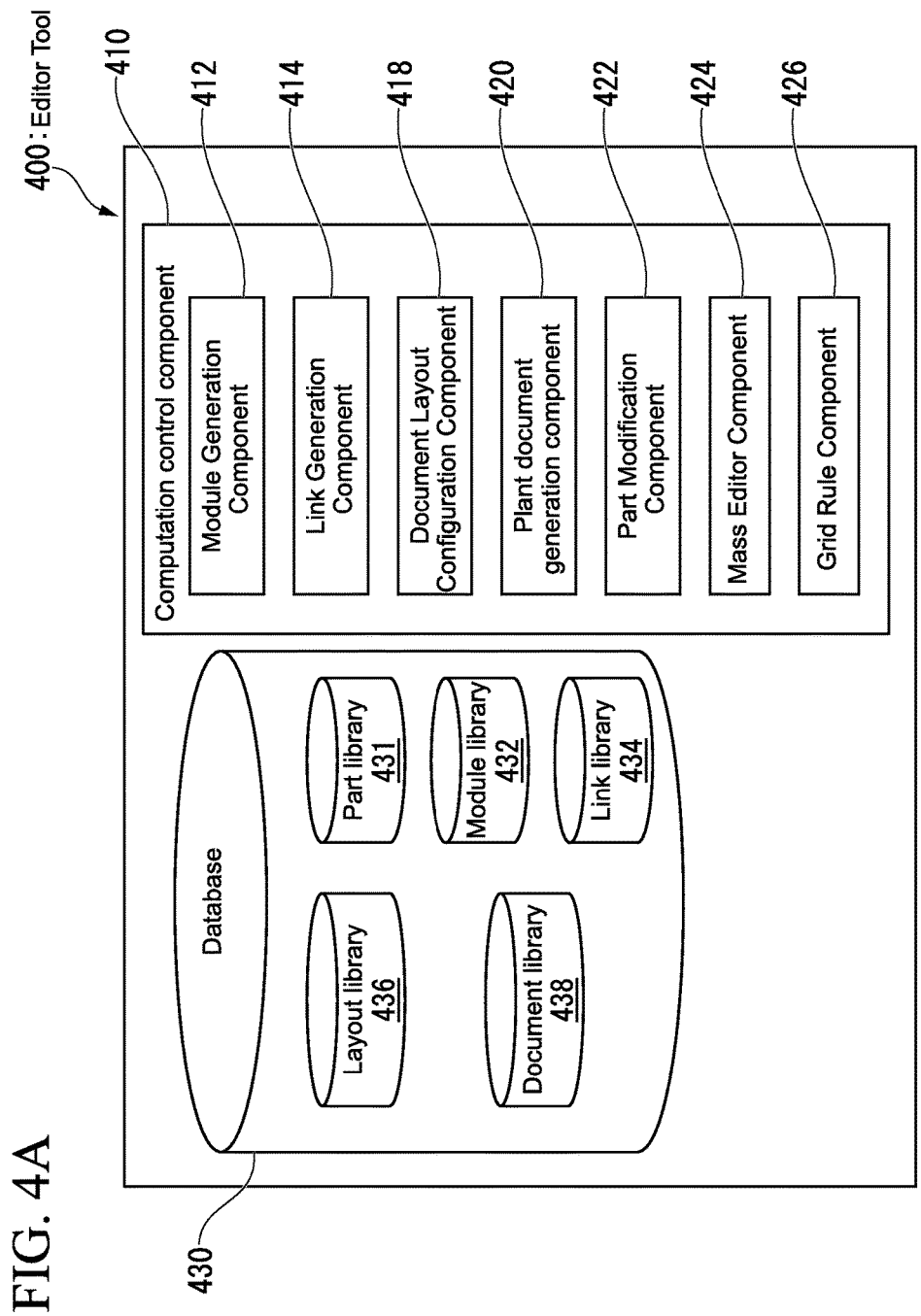
FIG. 4A illustrates an example editor 400.
Figure 5:
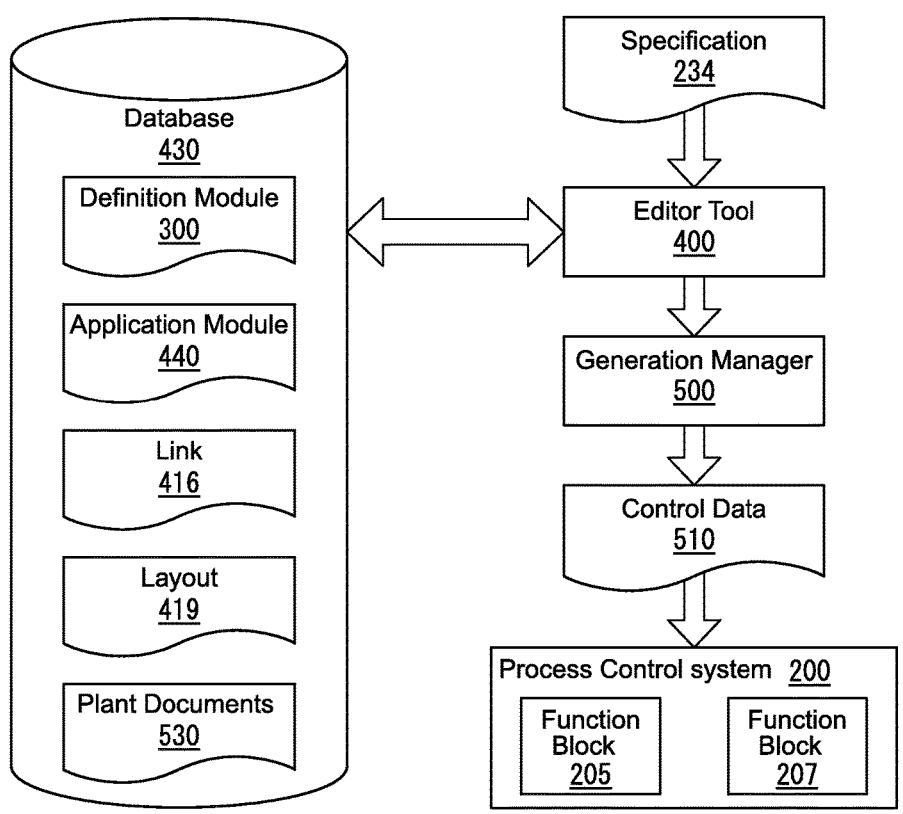
FIG. 5 illustrates an example block diagram of the invention according to some embodiments.
Figure 9:
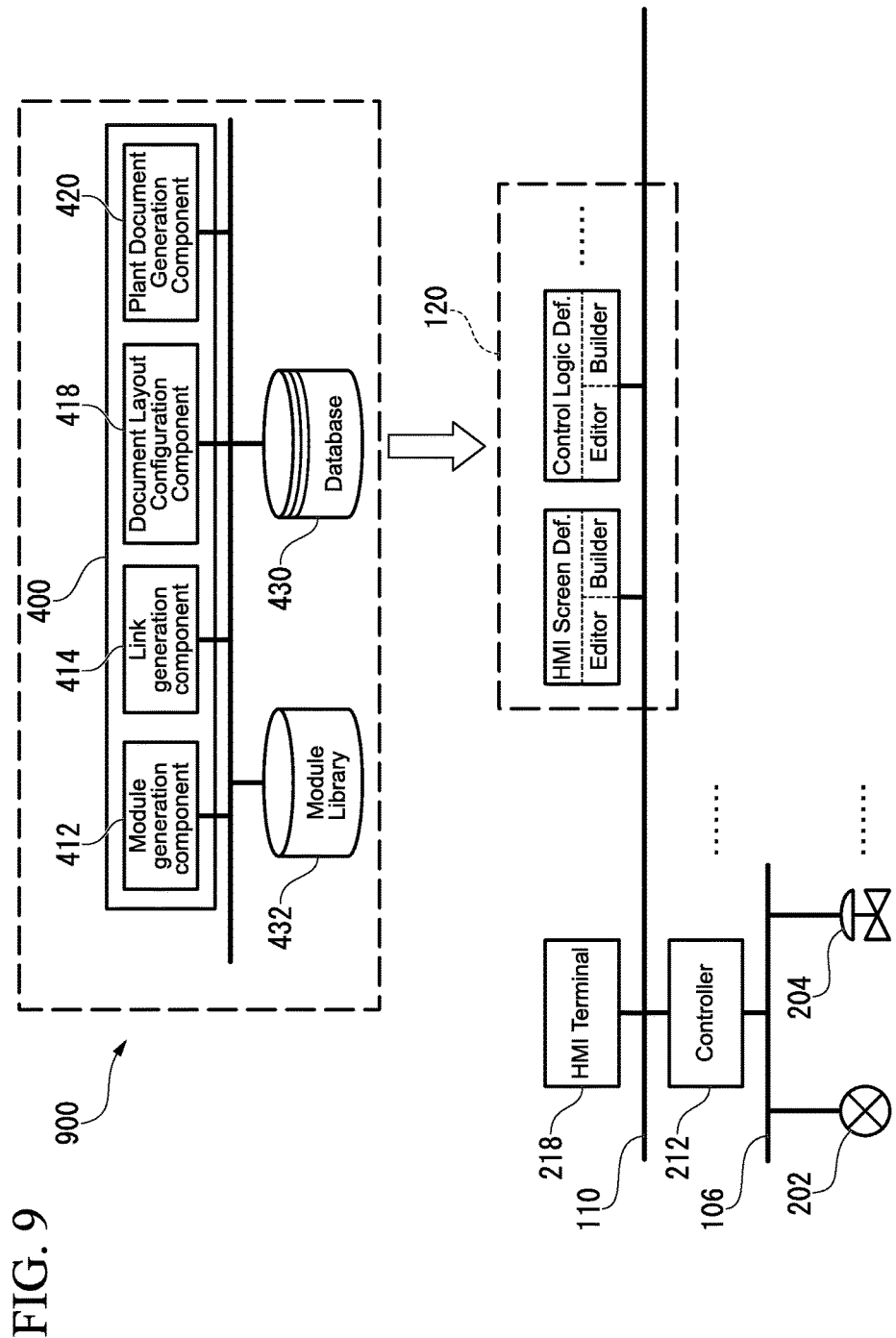
FIG. 9 is a process control configuration system according to some embodiments of the invention.

FIG. 4A illustrates an example editor tool 400 in a process control configuration system 900 in FIG. 9 and FIG. 5 illustrates an example block diagram of the editor tool 400 configured to be used for a process control system 200. The editor tool 400 is used to prepare, maintain and modify the definition module 300 based on design specifications 234 of the process control system 200 for industrial plant 230, process 232 or equipment 210. The prepared definition module 300 is stored in a module library 432 of a database 430. The database 430 is separate from the editor tool 400 according to some embodiments of the invention. In these embodiments, the editor tool 400 is configured to communicate with the repository 1300 which includes the database 430.

Computation Control Component 410

The editor tool 400 includes a computation control component 410. The computation control component 410 resides in a processor 1100 of a system 1000 according to some embodiments of the invention. The computation control component 410 controls all other components in the editor tool 400 to manipulate the definition module 300 and application module 440. The manipulation includes preparation, maintenance, modification and instantiation of the definition module 300 to generate an application module 440, and modification of the application module 440.

Module Generation Component 412

The editor tool 400 includes a module generation component 412. The module generation component 412 is configured to perform one or more functions described below. FIG. 6A is a workflow 610 for a function to generate an application module 440. In S612, the module generation component 412 retrieves the definition module 300 which is stored in the module library 432.

In S614, the module generation component 412 reads input, such as user input or input signals received from an input device 1200. The input is a data source according to some embodiments of the invention. The rule definition 328 in the definition module 300 defines data source parameters as input based on the design data 234.

In S616, the module generation component 412, based on the input and the definition module 300, generates or updates the definition module 300. The module generation component 412 generates or instantiates an application module 440 according to some embodiments of the invention.

Figure 7A:
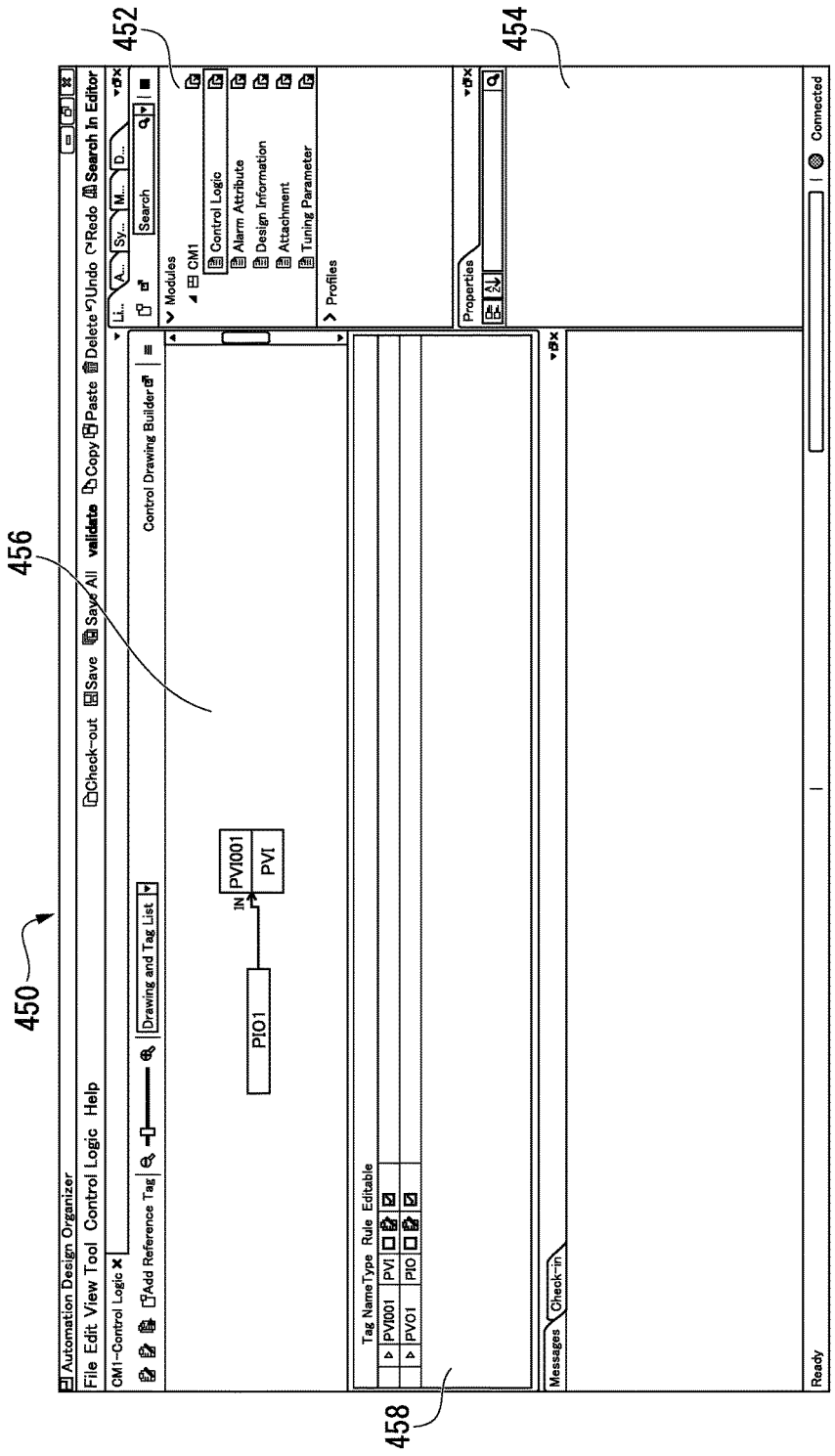
FIG. 7A is an example display screen for a module generator according to some embodiments of the invention.

FIG. 7A illustrates an example display screen 450, in the editor tool 400, of a generated definition module 300. The definition module 300 and its control logic definition files 320, document definition file 331, attachment file 340 are displayed in a module library window 452. The property file 310 is displayed in the same module library window 452 or in a separate module property file window 454 according to some embodiments of the invention. The control logic definition 322 for the definition module 300 is edited in a control logic editor window 456 using a known control logic editor or control logic drawing builder. The control logic definition 322 includes the part 220 and subparts 202, 204, 206. Properties which are fixed, and parameters which are variables of the properties, for each of the part 220 and sub-parts 202, 204, 206 are listed in a part property window

458. Examples of the properties displayed in the part property window 45 are identifier or "Tag Name", "Type", "Rule", "Tag Comment". For each property, the default or list of parameters are provided for selection, user input is checked for validity, or a check box is provided for selection appropriately.

The module library window 452, module property file window 454, control logic editor window 456 and part property window 458 are separate areas on the display screen 450. The windows are arranged in a tiled display for ease of view and use.

The application module 440 is equivalent to an instance in object oriented programming. In object oriented programming, an instance is generated by instantiating a class module, which applies or uses actual values in the class module. In the present invention, the actual values are based on user input or input signals received from an input device 1200.

The module generation component 412 generates a required number of application modules. In the example for the equipment 210, the required number of application modules 440, 442, 444, 446, 448 are generated or instantiated for the parts 220, 222, 224, 226, 228 control the equipment 210.

The module generation component 412 prepares or generates new definition modules 300 for each different status of the equipment 210. For this function, the module generation component 412 starts with a new definition module 300. The new definition module 300 has predefined default properties in the property file 310 and no information in the control logic definition file 320, document definition file 331. There are different types of definition module 300, for example for equipment 210 type, part 220 type, sub-part 206 type, function type, manufacturer type or a mixture of manufacturer-function type. The different types of definition module 300 are listed for selection in a method to prepare a new definition module 300. The selection includes an option to prepare a new type of definition module 300. This is based on user instructions in the form of user input or input signals received from the input device 1200.

The module generation component 412 modifies the application module 440 for each different status of the equipment 210. The relevant fields in the property file 310 are updated to identify the modified application 440. This is based on user instructions in the form of user input or input signals received from the input device 1200.

In S618, the module generation component 412 stores generated instantiated or modified application modules 440, and generated definition modules 300 in the database 430. The database 430 is set up in a same or different memory storage medium as editor tool 400.

The module generation component 412 is activated to perform the configured functions based predefined rules such as an input or schedule. Example of a predefined input is a user input, using the input device 1200, to activate the module generation component 412.

The module library 432 has a plurality of definition modules 300 according to some embodiments of the invention. The plurality of definition modules 300 is displayed in the module library window 452 in a hierarchy tree structure. This enables easy navigation to locate a desired definition module 300 for view or edit.

Link Generation Component 414

The editor tool 400 includes a link generation component 414. The link generation component 414 is configured to perform one or more functions described below.

Figure 6B:
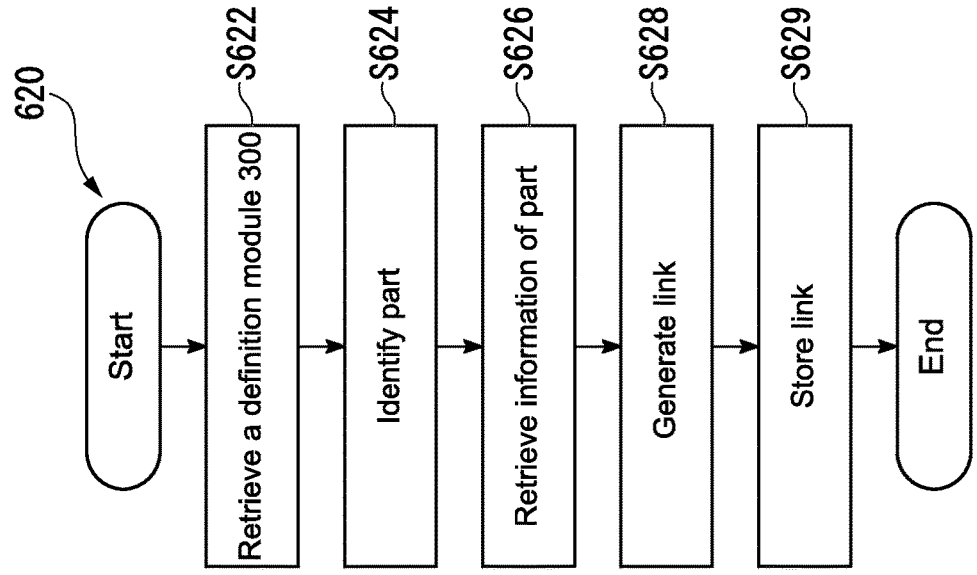
FIGS. 6A, 6B, 6C, 6D are workflows according to some embodiments of the invention.
Figure 6A:
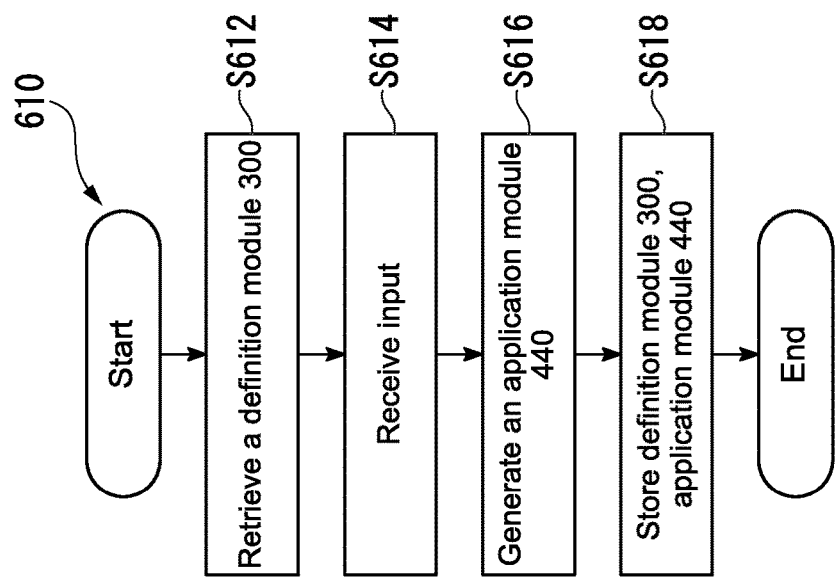

FIG. 6B is a workflow 620 of a function performed by the link generation component 414 according to some embodiments of the invention. The link generation component 414 retrieves each definition module 300 from the database 430 in S622. In S624, for each definition module 300, the link generation component 414 identifies the part 220, the sub-parts 202, 204, 206, the control logic definition 322, the application module 440 related to the definition module 300. In S626, the link generation component 414 retrieves information of the part 220, the sub-parts 202, 204, 206, the control logic definition 322, the application module 440 from the database 430 based on the identification in S624. In S628, the link generation component 414 generates a link 416 to link or bind the retrieved information. The link 416 as shown in FIG. 4B is between the application module 440 and definition module 300. In S629, the link generation component 414 stores the generated link 416 to the database 430.

A function of the link generation component 414 is to generate a link 417 when the application module 440 is assigned to controller 212. FIG. 6C is a workflow 630 performed by the link generation component to generate the link 417. Step S632 provides a list of the generated application module 440, 442, 444, 446, 448 for selection. Step S634 provides a list of available controllers 212 213, for selection, to be assigned to the selected application module 440 in S632. In Step S636, the link 417 is generated to link or bind the selected application module 440 to the controller 212. In Step S638, the link 417 is stored to the database 430. The link generation component 414 to generate the link 417 is provided as a separate link generation component 414 to generate the link 416 according to some embodiments of the invention.

Advantageously, the generated link 417 causes the application module 440 control logic 206 for the field devices 202, 204 to be executed in the controller 212. This is referred to as logical binding and is independent on the physical connection of the field devices 202, 204 with the controller 212. During a maintenance task, the logical binding is updated independent on the physical connection. Advantageously, a user performing a configuration task or maintenance task for any part 220 of the process control system 200 does not need to be concerned with the physical connection.

The link generation component 414 performs a link modification function according to some embodiments of the invention. The link generation module component 414 provides a listing of available options for the retrieved information. For example, the definition module 300 is identified for the part 220. The link generation module 414 provides a listing of other definition modules which are available options for the part. In another example, a listing of other field devices, identified by identifiers or tag names, which are available options for the subparts 202, 204. A user makes a selection from the available options. The link generation module component 414, based on the selection, generates an updated link 416. The updated link 416 is stored to the database 430.

Figure 7B:
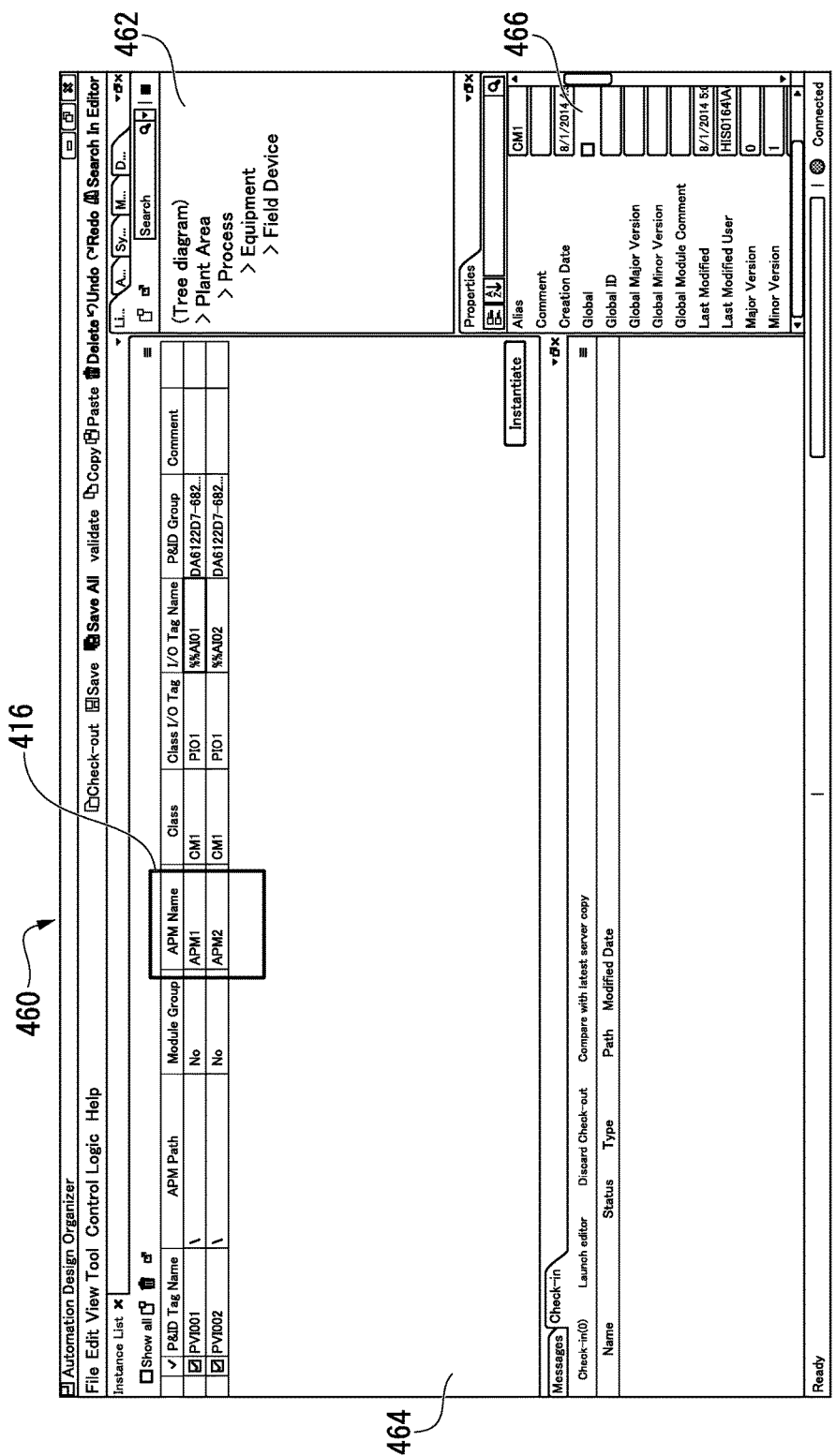
FIG. 7B is an example display screen to display a generated link according to some embodiments of the invention.

FIG. 7B is an example display screen 460, in the editor tool 400, to display the generated link 416. Navigation window 462 displays a plurality of group types, such as plant equipment, plant area, plant process, equipment vendor, for a user to select the desired equipment 210, part 220. In the present example, the user selects to view the equipment 210. A link list window 464 lists identifiers, in the column labelled "P&ID Tag Name", for the equipment 210. In this example, the identifier is for the controller 212 of each part 220, 222, 224, 226, 228. Information for each controller 212 is listed in the corresponding columns based on links 416 generated by the link generation component 414. The information illustrated in this example are "APM Path", which is a storage location for the corresponding application module 440, 442, 444, 446, 448; "APM Name" which is the name of the corresponding application module 440, 442, 444, 446, 448; "Class" which is the definition module 300 for each part; "IO Tag Name" which is the identifier for the corresponding sub-parts 202, 204. A property window 466 (not shown) is included to display properties of a selection on the display screen 460 when the selection has properties.

The navigation window 462, the link list window 464, the property window 466 and part property window 458 are separate areas on the display screen 460. The windows are arranged in a tiled display for ease of view and use. The list of available options for the information is provided in an option window or a drop down list 468 (not shown).

The link generation component 414 performs the functions when an application module 440 is generated. Alternatively, the link generation component 414 performs configured functions based on a predefined input, schedule or when a change is detected for any information according to some embodiments of the invention. Example of a predefined input is a user input, using the input device 1200, to activate the link generation component 414. Changes to the information include a selection of an alternative available option for a part, subpart of definition module.

Document Layout Configuration Component 418

The editor tool 400 includes a document layout configuration component 418. The document layout configuration component 418 is configured perform one or more functions described below to define a layout 419. The layout 419 is settings or configuration for a plant document 530. The layout 419 includes a listing of the settings, an example of the listing is a content listing or table of contents for the plant document 530. The plant document 530 is generated based on the layout 419.

Figure 6D:
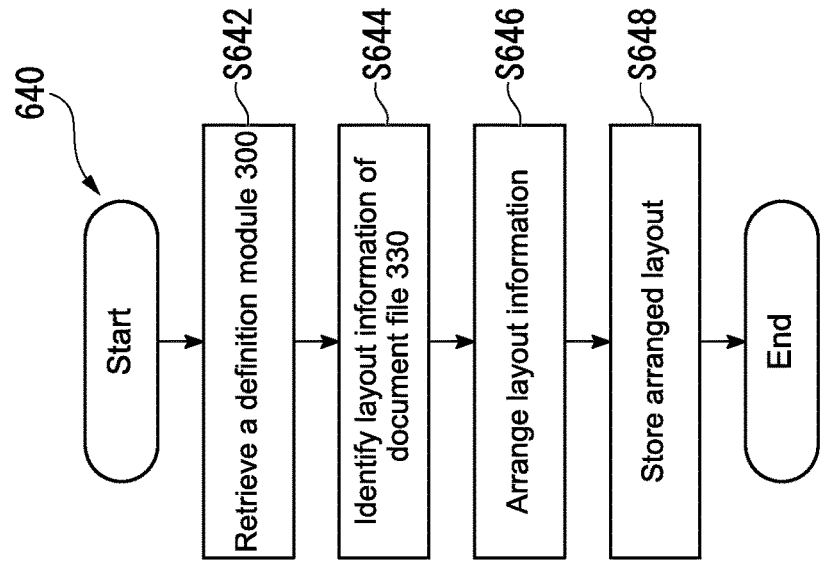
Figure 6C:
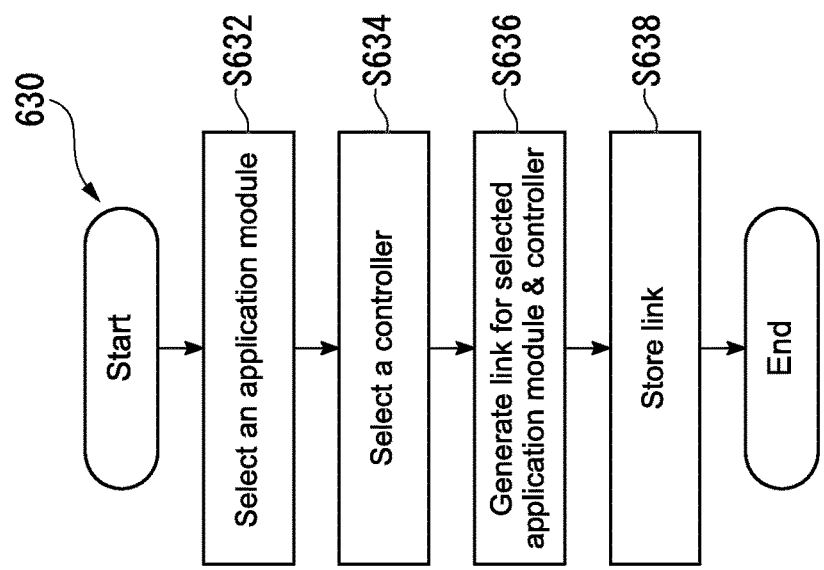

FIG. 6D is a workflow 640 of a function performed by the document layout configuration component 418 according to some embodiments of the invention. The document layout configuration component 418 retrieves each definition module 300 from the database 430 in S642. In S644, for each definition module 300, the document layout configuration component 418 identifies layout information of the document definition file 331. The layout information is contents of the layout file 334, or headers of document definition files 331, document files 332, 336, 338 when a layout file 334 is not defined for the document definition file 331.

In S646, the document layout configuration component 418 arranges, sets or fixes a layout 419, based on the layout information according to a predefined layout sequence or hierarchy. An example of a layout sequence is layout information for a definition module 300, followed by layout information for application modules 440, 442, 444, 446, 448. An example of a hierarchy is document files 332, 334, 336, 338 under the document definition file 331. The document layout configuration component 418 receives user input from input device 1200 to arrange the layout 419 according to some embodiments of the invention.

In S648, the arranged layout 419 is stored to the database 430.

Alternatively, the document layout configuration component 418 determines if a layout file 334 is defined for the document definition file 331 in each definition module 300. The document layout configuration component 418 retrieves an application module 440 for the definition module 300 when the layout file 334 is defined. The application module 440 is generated based on user input or input signals received from an input device 1200. The application module 440 inherits layout 419 from the layout information in the layout file 334. The document layout configuration component stores the inherited layout 419 in the database 430.

The document layout configuration component 418 has a layout modification function according to some embodiments of the invention. The document layout configuration component 418 retrieves a stored layout 419. The document layout configuration component 418, based on the retrieved layout 419 and user input received from an input device 1200, arranges, sets or fixes a layout 419. This improves the efficiency of preparing a plant document 530. The layouts 419 are categorized and stored according to type of plant document 530, for example, specification, instruction manual, control logic definitions, according to some embodiments of the invention. The information required for the different types of plant document 530 are usually different. In addition, different customers for different process plants have different documentation requirements. Advantageously, this improves the efficiency and consistency of documentation. Further, a database of available layouts 419 enables users to maintain a standardized documentation to minimize users creating unnecessary new layouts.

FIG. 7C is an example display screen 470 for the document layout configuration component 418. A layout window 472 displays layout information for a retrieved definition module 300 and an application module 440 according to a predefined sequence or hierarchy. The layout information is a list of headers or identifiers 474 for document definition files 331, document files 336, 338, 340 when a layout file 334 is not defined. In this example, a top level hierarchy of the layout information lists identifier properties of the definition module 300 "PID_A01", the application module 440 "PID_B01"; a subsequent level hierarchy lists documents 336, 338, 340 "Control Drawing", "Parameter Setting" "Narrative", "Applicable list".

The document layout configuration component 418, includes a selection tool 476 on the layout window 472 according to some embodiments of the invention. The selection tool 476 is a drag and drop function to rearrange the layout 419 based on the user input. The selection tool 476 is a checkbox provided for each header or identifier 474 to be included or excluded based on the user input.

Plant Document Generation Component 420

The editor tool 400 includes a plant document generation component 420. The plant document generation component 420 is configured to generate plant documents 530 such as specification, instruction manual, control logic definitions. The plant document generation component 420 retrieves a definition module 300, application module 440, links 416 and layout 419 from the database 430. The plant document generation component 420 applies the control logic definition 322, links 416,417 and layout 419 to generate the plant document 530. The generated plant document 530 is stored in the database 430.

Using an example for explanation, the plant document generation component 420 retrieves for an equipment 210, the stored definition module 300, application modules 440, 442, 444, 446, 448 for the parts 220, 222, 224, 226, 228, links 416, 417 and layout 419. The plant document generation component 420 generates a plant document 530, based on the control logic definitions 322, links 416, 417 and layout 419.

Figure 7D:
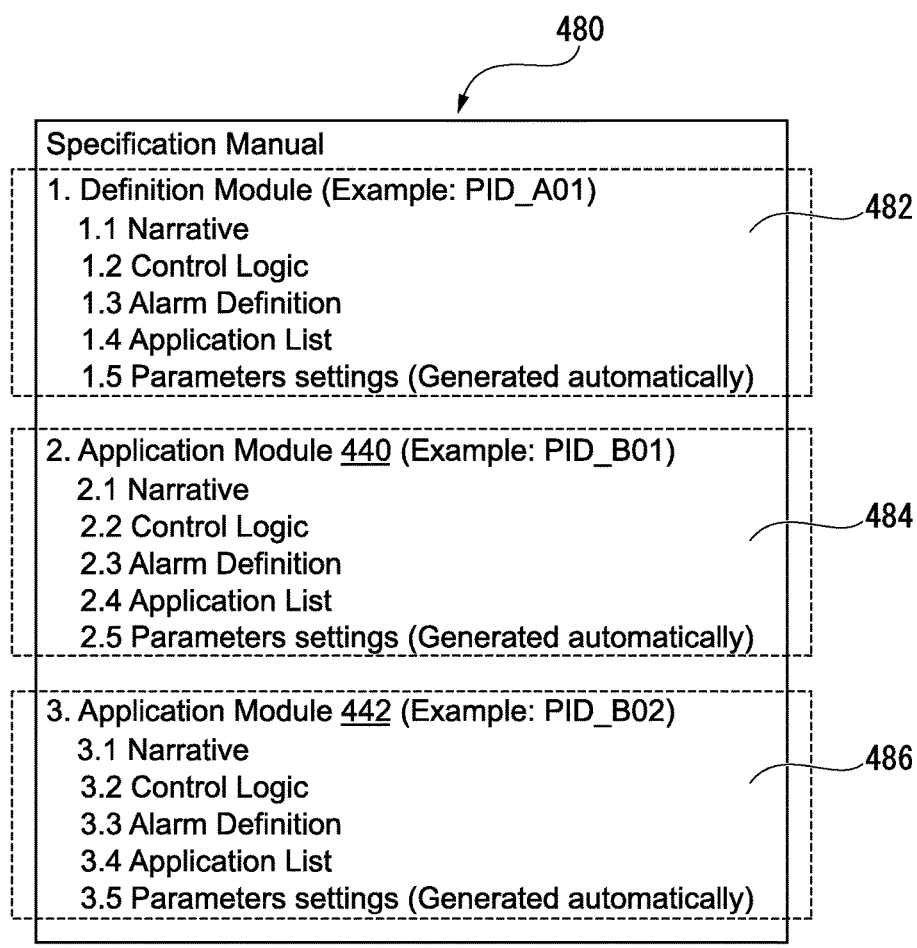
FIG. 7D is an example contents table of a plant document according to some embodiments.

FIG. 7D is an example contents table 480 of a plant document 530. Contents list 482 is generated based on the definition module 300 and the relevant links 416, 417 layout 419. Contents list 484 is generated based on the application module 440, the relevant links 416, 417, and layout 419. Contents list 486 is generated based on the application module 442 and the relevant links 416, 417 layout 419.

Since the plant document 530 is generated based on control logic definitions 322, the plant document 530 is consistent with the control logic definitions 322. The plant document 530 is automatically generated by this invention which improves the efficiency and accuracy for generation and update of the plant document 530 for any changes in the design data 234 of the industrial plant 230 such as process 232, control logic 206, parameter setting 324, alarm setting 325. The improved accuracy increase reliability of the plant document 530 when it is used to understand the setting or configuration of the industrial plant 230.

Further, a plurality of plant documents 530 for different control logic or different composition of raw materials are conveniently and efficiently generated when the difference is updated in the definition module 300 or application module 440. Significantly less manpower, time and effort is required to understand the difference and generate plant documents 530 when using this invention. Less time and cost are required for preparation, maintenance and update of the plant documents 530.

In an implementation of a process control system 200 for an industrial plant 230, document data 332 is prepared based on specifications of the process control system 200. The document data 332 is then translated to control data 510 to be encapsulated in multiple function blocks 205, 207. Then tests are done to ensure that the industrial plant 230 performs according to specifications. A plurality of plant documents 530 is prepared for different aspects of the industrial plant 230, from the document data 332 to the test data. Often, information or data is related or even duplicated. The present invention generates links 416 so that related data and plant documents 530 are updated automatically for any change. This improves the efficiency on preparation, maintenance and update of process control system 200.

Part Modification Component 422

Test operations are performed during preparation or maintenance of process control system 200. During the test operations, there are changes in the industrial plant 230 to improve yield from the control logic 206. Examples of such changes are parameter settings 324 of part equipment 210, sub-parts field devices 202, 204 and any other relevant part-related information. Besides improving the yield during test operations, other reasons for the same changes include change in specifications of the industrial plant 230 and mistakes to be fixed.

The editor tool 400 includes a part modification component 422 configured to modify part-related information of part equipment 210, sub-parts field devices 202, 204, such as parameter setting 324. The module generation component 412 automatically updates corresponding information of the definition module 300 and application module 440 when the part modification component 422 has modified the part-related information. The module generation component 412 is activated to perform configured functions based predefined rules such as an input or schedule. Example of a predefined input is a user input, using the input device 1200, to activate the module generation component 412.

The editor tool 400 transmits the application module 440 to the generation manager 500 to convert the control logic 206 in control logic definition 322, alarm definition 326 to logic control data 512. The link 417 is also transmitted and converted to link control data 514. The process control system 200 determines the logic control data 512 to be executed in the controller 212 to control the process 232 based on the link control data 514.

Mass Editor Component 424

The editor tool 400 includes a mass editor component 424. The mass editor component 424 updates a parameter change in all related modules or files. The mass editor component 424 is configured to be activated in any editor or configuration component in the editor tool 400.

In an example the mass editor component 424 is activated in a control logic editor in the module generation component 412. The mass editor component 424 identifies, from the database 430, all files and modules which are editable by the control logic editor. The mass editor component 424 provides a list of the identified files and modules for user selection according to some embodiments of the invention.

The identified or selected files and modules are then checked out of the database 430 or locked for a concurrent edit by a user or another tool. This maintains data integrity of the files and modules. The parameters in the checked out files and modules are generated in an output file for view and edit. In some embodiments, the output file is a data grid based on a predefined data grid format for the control logic editor. The cells in the data grid are differentiated to editable and read-only cells according to some embodiments of the invention.

An input for a parameter change is received by the mass editor component 424. The mass editor component 424 determines the related parameters in the output file and updates the related parameters accordingly.

In the embodiment when the output file is a data grid, the mass editor component 424 further includes a grid rule component 426. The grid rule component 426 is configured to define a grid rule which has a logical condition for a parameter change and a corresponding action to update the related parameters in the data grid when the logical condition is fulfilled. An example use of grid rule is to change naming convention of tags for a type of tags starting with "ABC###" to "XYZ###". The mass editor component 424 uses the defined grid rule to search for tag identifiers which fulfil the logical condition when the tag identifiers start with "ABC". The mass editor component 424 performs a corresponding action to replace "ABC" with "XYZ" in the searched tag identifiers.

The mass editor component 424 determines if the parameter change and updates in the related parameters are valid prior to check in or unlock of the identified files and modules.

The defined grid rule is stored to the repository 1300 for re-use by other mass editor components 424. The mass editor component 424 imports a defined rule from the repository for direct use or modification before use according to some embodiments of the invention The mass editor component 424 improves efficiency, flexibility and reliability of bulk or mass data change such as parameter value update or naming convention change. In a conventional system for bulk data change, all the files are listed for filtering or selection, then the details in the filtered file are further filtered or selected. The filtered data from the details is exported to a spreadsheet such as Microsoft Excel™ or comma-separated (.CSV) files to effect the change before imported to replace the exported files. There is no validity check for the change which may result in data failures when the imported files are read. Resources are lost to determine and rectify the cause of the data failures. Further, when the filtered data is exported, multiple exports can be done simultaneously by a different user or another tool. The data integrity may be lacking when changes may not have been effected on a desired version of the data.

Method of Invention

Figure 8A:
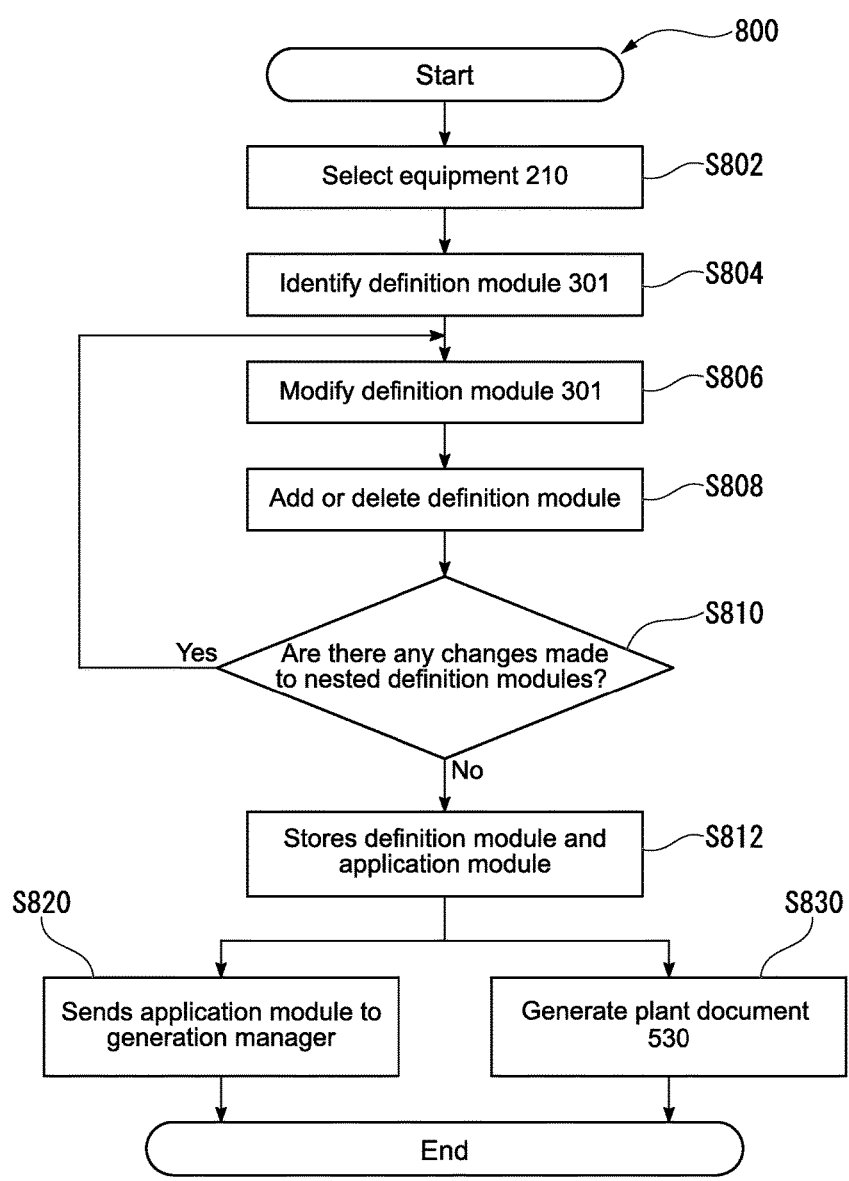
FIG. 8A is a workflow of an editor according to some embodiments of the invention.

FIG. 8A is a workflow 800 for using the editor tool 400 to set up or configure a process control system 200 based on specifications 234 for equipment 210 selected in step S802. Step S804 identifies a definition module 301 for the equipment 210. The definition module 301 is identified to be a definition module 300 without nesting levels or a definition module 301 with multiple nesting levels. The definition module 301 is prepared using the module generation component 412 or searched from the database 430 using a search function in the editor tool 400.

Step S806 modifies the definition module 301 according to the specifications 234. Property file 310, control logic definition file 320, document definition file 331 in the definition module 301 are modified based on the specifications 234.

Step S808 determines if new definition modules 300 are required and added when required. Obsolete modules 300 are determined and are deleted when the definition module 301 includes multiple definition modules 300. Obsolete definition modules 300 are those which are not applicable or valid based on the specifications 234.

Step S810 determines whether any changes are made to the nested modules 302, 304, 306 when the definition module 301 includes nested modules 302, 304, 306. Steps S806 and S808 are repeated for each nested module 302, 304, 306 which is changed based on specifications 234.

Step S812 stores the updated definition module 301 according to some embodiments of the invention. Step S812 generates corresponding application modules 440, 442, 444, 446, 448 according to some embodiments of the invention. Then at least one of the updated definition module 301 and its corresponding application modules 440, 442, 444, 446, 448 are stored to the database 430.

In Step 820, the editor tool 400 retrieves the application modules 440, 442, 444, 446, 448 from the database 430 and sends the application modules 440, 442, 444, 446, 448 to a generation manager 700. The generation manager 700 prepares control data 510 based on the application modules 440, 442, 444, 446, 448 for the process control system 200. In particular, the control data 510 is prepared for the function blocks 205, 207 of the process control system.

In Step 830, the editor tool 400, based on user input from the input device 1200 the plant document generation component 420, generates plant documents 530 from the application modules 440.

Figure 8B:
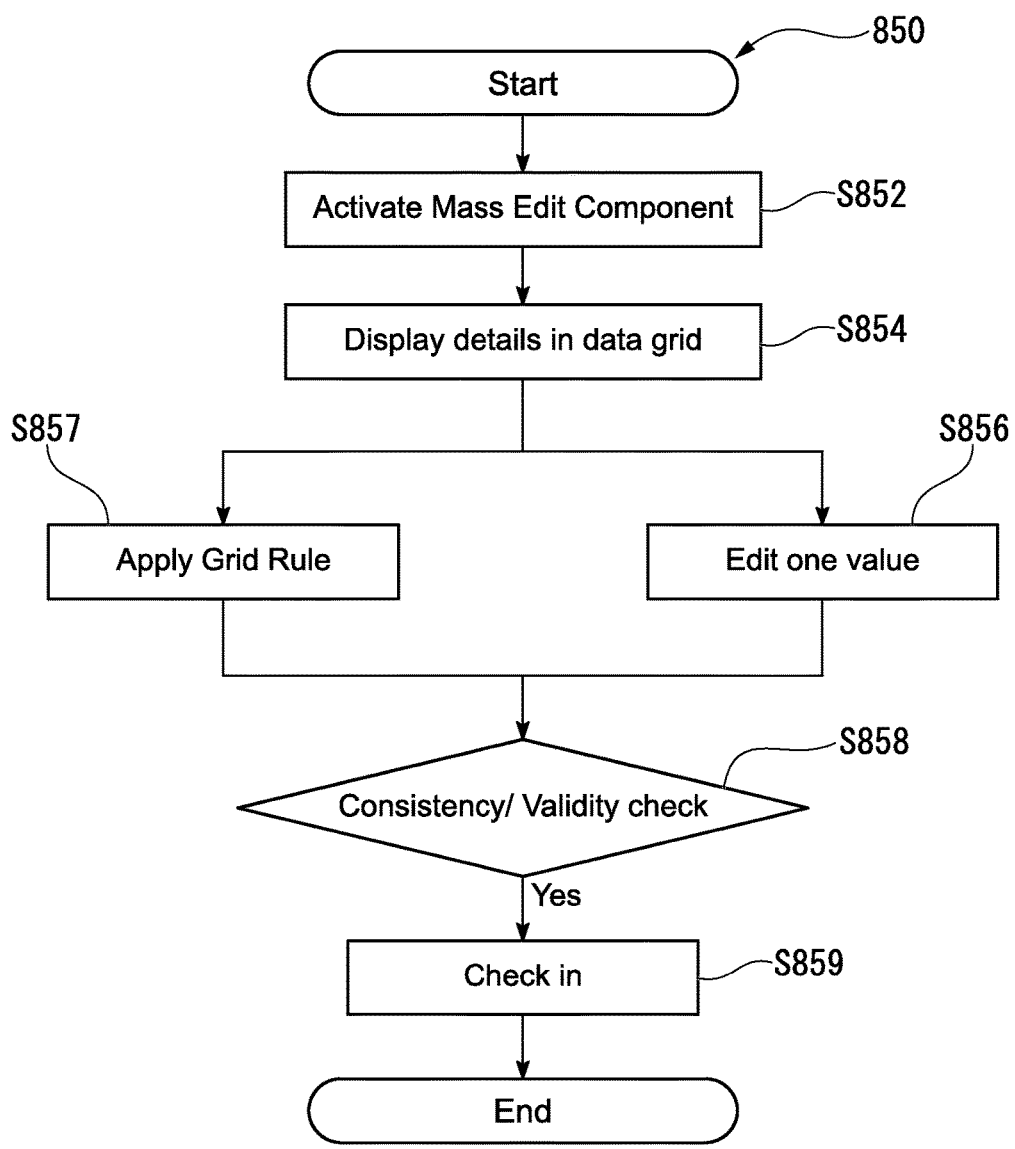
FIG. 8B is a workflow of a mass editor according to some embodiments of the invention.

FIG. 8B is an example workflow 850 for using the mass editor component 424 according to some embodiments of the invention.

The mass editor component 424 is activated in a control logic editor in the module generation component 412 in Step S852. The mass editor component 424 identifies, from the database 430, all files and modules which is editable by the control logic editor. The mass editor component 424 provides a list of the identified files and modules for user selection according to some embodiments of the invention.

Step S854, the identified or selected files and modules are checked out of the database 430. The parameters in the checked out files and modules are generated in a data grid based on a predefined data grid format for the control logic editor. The cells in the data grid are differentiated to editable and read-only cells according to some embodiments of the invention.

In Step S856, an input for a parameter change is received by the mass editor component 424. The mass editor component 424 determines the related parameters in the data grid and updates the related parameters accordingly. Step S857 is an alternative step to import or define a grid rule with a logical condition and a corresponding action when the logical condition is fulfilled.

In Step S858, the mass editor component 424 determines if the parameter change and updates in the related parameters are valid prior to check in or unlock of the identified files and modules. The check in or unlock of identified files is in Step S859.

Advantageously, this invention improves ease of preparing control data for any process control system 200 based from specifications 234. In addition, plant documents 530 are generated with less effort when the document definition files 331, attachment files 340 are updated based on the specifications 234. This reduces manpower costs for preparing, generating control data 510 and plant documents 530 for each modification, change or maintenance of the industrial plant 230. Further, the database 430 is available to be used for different industrial plants 230, thus improving the efficiency to modify, set up or configure a process control system 200 for a new process 232 or new industrial plant 230.

In a situation where control logic definition 322, is confidential, the confidential application module 440 is not made available for use in different industrial plant 230. However, the definition module 300 is still available or vice versa for the application module 440 when the definition module 300 is confidential.

System Configuration

FIG. 9 is a system configuration 900 for process control according to some embodiments of the invention. The field devices 202, 204 are connected to a field network 106. The field devices 202, 204 are connected through input-output (I/O) units to controllers 212 which are in a control network 110. The editor tool 400 is configured at the control network 110 level to prepare definition module 300 as described above. The control network 110 is suitable for process control systems that incorporates general communication functions and enables highly reliable, real-time, and stable communications. An example of the control network is Vnet/IP which uses the IP Internet protocol for general-purpose communications and conforms to CPF-10 of the real-time Ethernet (RTE) communication profile defined in IEC 61784-2.

Figure 10:
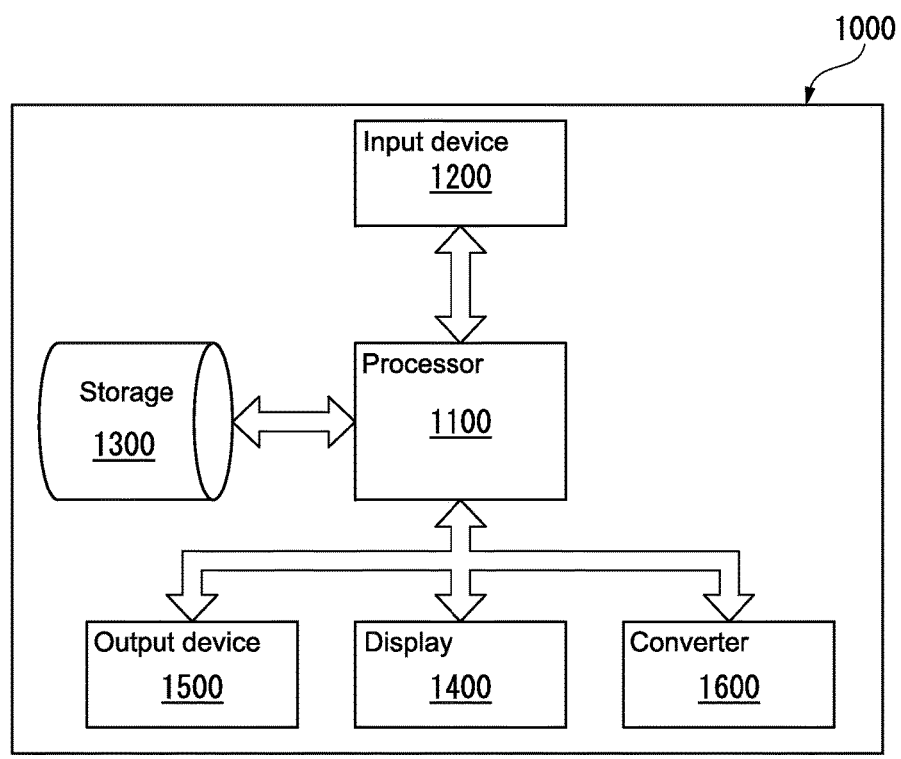
FIG. 10 is a block diagram for a process control configuration system.

FIG. 10 is a block diagram for a system 1000 configuration of the present invention. The system 1000 includes a processor 1100 which is part of a computer. The processor 1100 communicates with input device 1200, storage 1300, display 1400, output or transmission device 1500. The input device 1200, storage 1300, display 1400, output or transmission device 1500 are in the same or separate computer as the processor according to some embodiments of the invention.

The editor tool 400 and the converter tool 500 are implemented in one or more processors 1100.

Input device 1200 is an interface device to receive user input, input import from alternative source/third parties. Examples of input device 1200 are keyboard, pointing device such as a mouse, touch-sensitive display interface.

Database 430 is in storage or repository 1300 is a memory storage medium such as Random Access Memory, Read Only Memory or Hard Disk Drive for. The memory storage medium stores part library 431 which includes equipment 210, parts 220, 222, 224, 226, 228, sub-parts field devices 202, 204, control logic 206, network device 208; module library 432 which includes the definition modules 300, 301, 302, 304, 306, derivative application modules 440, 442, 444, 446, 448; link library 434 links 416, 417; layout library 436 for layouts 419; document library 438 for plant documents 530 and related information described above.

The database 430 has a plurality of memory components to store the information by type. Advantageously, this improves the ease of configuring the components 410, 412, 414, 418, 420, 422 in the editor tool 400 to retrieve the required information. Configuring the components 410, 412, 414, 418, 420, 422 include setting them to perform the functions described above. Further, the stored information is suitable to be retrieved for any other purpose such as an external tool.

The invention is not limited to the described embodiments. The invention is intended to cover alternatives, modifications and equivalents, which may be included within the spirit and scope of the invention as defined by appended claims. Furthermore, it will be obvious to one of ordinary skill of the art that the present invention may be practiced without the specific details. The specific details have been included to provide a thorough understanding of the invention. Finally, well known methods, procedures, components, and features have not been described in detail as not to unnecessarily obscure aspects of the present invention.

Further embodiments of the inventions are described below.

A configuration system for a process control system configured to perform process control. The configuration system includes, not limited to, a) a definition module, which is stored in a memory, for a part of an industrial plant based on design data. The definition module includes, not limited to, a-1) a control logic definition file configured to define a control logic for the part, and a-2) a data definition file configured to define data relating to the defined control logic.

The configuration system of claim 1, further includes b) an editor configured to perform at least one of generation and update of at least one of the control logic definition file and the data definition file, wherein the editor is implemented by one or more processors.

The configuration system in claim 2 further includes c) a converter configured to convert the control logic definition into control data for the process control system, wherein the converter is implemented by one or more processors.

The configuration system, wherein the definition module further includes a-3) a property file configured to store a module property for the part.

The configuration system, wherein the part includes one input parameter and one output parameter.

The configuration system is further configured to communicate with a data source which includes a parameter for the part. The control logic comprises a control logic parameter. The data definition file comprises a rule file configured to define a rule comprising a condition and an action for setting the parameter to the control logic parameter, based on the defined condition.

The configuration system, wherein the data definition file comprises a document file configured to define control logic specifications data for documentation.

The configuration system, wherein the part includes a plurality of sub-parts, and the definition module comprises a plurality of sub-part definition modules for the sub-parts.

The configuration system wherein the control logic definition file is further configured to define at least one tuning parameter.

Another aspect of the invention is a configuration system for a process control system configured to perform process control, the configuration system includes, not limited to, a) an editor configured to generate an application module, the application module includes, not limited to a-1) a control logic definition file configured to define a control logic for the part, and a-2) a data definition file configured to define data relating to the defined control logic. The editor is implemented by one or more processors.

The configuration system is configured to communicate with a server having a data source. The editor is further configured to retrieve a definition module which includes a first control logic and design data and retrieve, from the data source in the server, part-related data. The application module is as an instance of the definition module based on the part-related data. The control logic definition file has an instantiated second control logic based on the part-related data, and the data definition file has an instantiated data relating to the second control logic.

The configuration system further includes b) a converter configured to convert the application module to control logic data for the process control system. The converter is implemented by one or more processors.

The configuration system wherein the part comprises one input parameter and one output parameter.

The configuration system is further configured to communicate with a data source includes a part source parameter for the part, wherein the control logic includes a control logic parameter. The data definition file includes a rule file configured to define a rule comprising a condition and an action for setting the part source parameter to the control logic parameter, based on the defined condition.

The configuration system wherein the data definition file includes a document file configured to define control logic specifications data for documentation.

The configuration system wherein the control logic definition file is further configured to define at least one tuning parameter.

In yet another aspect of the invention is a non-transitory computer readable medium that stores a computer program to be executed by a configuration system to perform a configuration method performed by a configuration system for a process control system configured to perform process control. The configuration method includes, not limited to, a) storing, in a memory, a definition module for the part of the industrial plant. The definition module includes, not limited to a-1) a control logic definition file configured to define a control logic for the part, and a-2) a data definition file configured to define data relating to the defined control logic; and b) updating the definition module.

The method, in the medium, further includes c) performing, using an editor, at least one of generation and update of at least one of the control logic definition file and the data definition file. The editor is implemented by one or more processors.

The method, in the medium, further includes d) converting, using a converter, the definition module to control logic data for the process control system. The converter is implemented by one or more processors.

In another aspect of the invention, a process control system for use in a process plant having a user interface and one or more process controllers. The process control system includes, not limited to, a) an application module instantiated from a definition module, b) a converter configured to convert the control logic definition into control data, and c) a controller adapted to execute the control data on the one or more process controllers to implement process control activities within the process plant. The application module, includes, not limited to a-1) a control logic definition file configured to define a control logic for a part of the process plant, and a-2) a data definition file configured to define data relating to the defined control logic. The editor and the converter are implemented by one or more processors.

What is claimed is:

1. A configuration system for a process control system configured to perform process control, the configuration system comprising:
 a definition module, stored in a database, for a part of an industrial plant based on design data, the part comprising at least one of plant equipment and field devices of the industrial plant, the part including a plurality of sub-parts, and the definition module comprising a plurality of sub-part definition modules for the sub-parts, the definition module comprising:
  a control logic definition file configured to define a control logic for the part, wherein the control logic comprises a control logic parameter, and the control logic is to be converted into control data for execution in a field controller configured to control the at least one of plant equipment and field devices in accordance with the design data; and
  a data definition file configured to define data relating to the defined control logic, wherein the data definition file comprises a document file configured to define control logic specifications data for documentation; a rule file configured to define a rule comprising a condition and an action for setting the parameter to the control logic parameter, based on the defined condition; and a property file configured to store a module property for the part;
 an application module, stored in the database; and
 a computation control component configured to perform at least one of generation and modification of the control logic definition file and the data definition file to perform at least one of generation and modification of the application module, based on the control logic definition file, the data definition file, and the property file of the definition module,
 wherein the computation control component comprises:
  a module generation component configured to generate the definition modules for each different status of equipment; and
  a link generation component configured to:
   identify, for each of the definition modules, the part, the sub-parts, the control logic definition, and the application module related to the definition module;
   retrieve, from the database, the part, the sub-parts, the control logic definition, and the application module related to the definition module;
   generate a link between the application module and the definition module and store the link into the database; and
   generate a link between the application module and a controller when the application module is assigned to the controller to logically bind the at least one plant equipment and the field devices of the industrial plant to the controller, and to place the at least one of the plant equipment and the field devices of the industrial plant into an independent state on the physical connection with the controller.

2. The configuration system in claim 1 further comprising:
 a converter configured to convert the control logic definition into control data for the process control system, wherein the converter is implemented by one or more processors.

3. The configuration system in claim 1 wherein the part comprises one input parameter and one output parameter.

4. The configuration system in claim 1, wherein the system is further configured to communicate with a data source comprising a parameter for the part.

5. The configuration system in claim 1, wherein the control logic definition file is further configured to define at least one tuning parameter.

6. A configuration system for a process control system configured to perform process control, the configuration system comprising:
 an editor configured to perform at least one of generation and modification of an application module, the application module comprising:
  a control logic definition file configured to define a control logic for a part of an industrial plant based on design data, wherein the part comprises at least one of plant equipment and field devices of the industrial plant, and wherein the control logic is to be converted into control data for execution in a field controller configured to control the at least one of plant equipment and field devices in accordance with the design data; and
  a data definition file configured to define data relating to the defined control logic,
  wherein the data definition file comprises a document file configured to define control logics specifications data for documentation, a rule file configured to define a rule comprising a condition and an action for setting the parameter to the control logic parameter, based on the defined condition, and a property file configured to store a module property for the part; and
 an application module, stored in the database; and
 a computation control component configured to perform at least one of generation and modification of the control logic definition file and the data definition file to perform at least one of generation and modification of the application module, based on the control logic definition file, the data definition file, and the property file of the application module,
 wherein the computation control component comprises:
  a module generation component configured to generate the definition modules for each different status of equipment; and
  a link generation component configured to:
   identify, for each of the definition modules, the part, the sub-parts, the control logic definition, and the application module related to the definition module;
   retrieve, from the database, the part, the sub-parts, the control logic definition, and the application module related to the definition module;
   generate a link between the application module and the definition module and store the link into the database; and
   generate a link between the application module and a controller when the application module is assigned to the controller to logically bind the at least one plant equipment and the field devices of the industrial plant to the controller, and to place the at least one of the plant equipment and the field devices of the industrial plant into an independent state on the physical connection with the controller, and wherein the editor is implemented by one or more processors.

7. The configuration system in claim 6 wherein the configuration system is configured to communicate with a server having a data source, wherein the editor is further configured to:

retrieve a definition module comprising a first control logic and design data; and retrieve, from the data source in the server, part-related data, wherein the application module is as an instance of the definition module based on the part-related data, and wherein the control logic definition file having an instantiated second control logic based on the part-related data, the data definition file having an instantiated data relating to the second control logic.

8. The configuration system in claim 6 further comprising:

a converter configured to convert the application module to control logic data for the process control system, wherein the converter is implemented by one or more processors.

9. The configuration system in claim 6 wherein the part comprises one input parameter and one output parameter.

10. The configuration system in claim 6, wherein the system is further configured to communicate with a data source comprising a part source parameter for the part.

11. The configuration system in claim 6, wherein the control logic definition file is further configured to define at least one tuning parameter.

12. A non-transitory computer readable medium that stores a computer program to be executed by a configuration system to perform a configuration method performed by a configuration system for a process control system configured to perform process control, the configuration method comprising:

storing, in a memory, a definition module for a part of an industrial plant based on design data, wherein the part comprises at least one of plant equipment and field devices of the industrial plant, the definition module comprising:

a control logic definition file configured to define a control logic for the part wherein the control logic is to be converted into control data for execution in a field controller configured to control the at least one of plant equipment and field devices in accordance with the design data, a data definition file configured to define data relating to the defined control logic, wherein the control logic comprises a control logic parameter, and the control logic is to be converted into control data for execution in a field controller configured to control the at least one of plant equipment and field devices in accordance with the design data; and a property file configured to store a module property for the part updating the definition module;

storing, in the memory, an application module;

performing at least one of generation and modification of the control logic definition file and the data definition file to perform at least one of generation and modification of the application module, based on the control logic definition file, the data definition file, and the property file of the definition module;

generating the definition modules for each different status of equipment;

identifying, for each of the definition modules, the part, the sub-parts, the control logic definition, and the application module related to the definition module;

retrieving, from the database, the part, the sub-parts, the control logic definition, and the application module related to the definition module;

generating a link between the application module and the definition module;

storing the link into the database; and generating a link between the application module and a controller when the application module is assigned to the controller to logically bind the at least one plant equipment and the field devices of the industrial plant to the controller, and to place the at least one of the plant equipment and the field devices of the industrial plant into an independent state on the physical connection with the controller.

13. The non-transitory computer readable medium in claim 12 wherein the method further comprises:

performing, using an editor, at least one of generation and update of at least one of the control logic definition file and the data definition file, wherein the editor is implemented by one or more processors.

14. The non-transitory computer readable medium in claim 12 wherein the method further comprises:

converting, using a converter, the definition module to control logic data for the process control system, wherein the converter is implemented by one or more processors.

15. A process control system for use in a process plant having a user interface and one or more process controllers, the process control system comprising:

an application module instantiated from a definition module, the application module comprising:

a control logic definition file configured to define a control logic for a part of the process plant wherein the part comprises at least one of plant equipment and field devices of the process plant, and wherein the control logic is to be converted into control data for execution in a field controller configured to control the at least one of plant equipment and field devices in accordance with the design data, and a data definition file configured to define data relating to the defined control logic, wherein the data definition file comprises a document file configured to define control logic specifications data for documentation, and a rule file configured to define a rule comprising a condition and an action for setting the parameter to the control logic parameter, based on the defined condition; and a property file configured to store a module property for the part;

a converter configured to convert the control logic definition into the control data; and a controller adapted to execute the control data on the one or more process controllers to implement process control activities within the process plant, the controller adapted to perform at least one of generation and modification of the control logic definition file and the data definition file to perform at least one of generation and modification of the application module, based on the control logic definition file, the data definition file, and the property file of the application module, wherein the computation control component comprises:
   a module generation component configured to generate the definition modules for each different status of equipment; and
   a link generation component configure to:
      identify, for each of the definition modules, the part, the sub-parts, the control logic definition, and the application module related to the definition module;
      retrieve, from the database, the part, the sub-parts, the control logic definition, and the application module related to the definition module;
      generate a link between the application module and the definition module and store the link into the database; and
      generate a link between the application module and a controller when the application module is assigned to the controller to logically bind the at least one plant equipment and the field devices of the industrial plant to the controller, and to place the at least one of the plant equipment and the field devices of the industrial plant into an independent state on the physical connection with the controller
wherein the editor and the converter are implemented by one or more processors.

* * * * *